US 10,979,700 B2

(12) United States Patent
Koyama

(10) Patent No.: US 10,979,700 B2
(45) Date of Patent: Apr. 13, 2021

(54) DISPLAY CONTROL APPARATUS AND CONTROL METHOD

(71) Applicant: CANON KABUSHIKI KAISHA, Tokyo (JP)

(72) Inventor: Jun Koyama, Tokorozawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/363,308

(22) Filed: Mar. 25, 2019

(65) Prior Publication Data

US 2019/0306491 A1    Oct. 3, 2019

(30) Foreign Application Priority Data

Mar. 27, 2018 (JP) .............................. JP2018-060528

(51) Int. Cl.
*G06F 3/041*    (2006.01)
*H04N 13/398*    (2018.01)
(Continued)

(52) U.S. Cl.
CPC ......... *H04N 13/398* (2018.05); *G06F 3/0485* (2013.01); *G06F 3/04815* (2013.01);
(Continued)

(58) Field of Classification Search
CPC .... H04N 13/275; H04N 13/161; H04N 5/232; H04N 21/2187; H04N 21/278;
(Continued)

(56) References Cited

U.S. PATENT DOCUMENTS 5,862,252 A * 1/1999 Yamamoto ............. G01B 11/24
345/419
7,583,414 B2 * 9/2009 Kawai ................ H04N 5/23206
358/450

(Continued)

FOREIGN PATENT DOCUMENTS

JP    2017-107549 A    6/2017

OTHER PUBLICATIONS

The above patent document was cited in a European Search Report dated Jul. 24, 2019 which is enclosed, that issued in the corresponding European Patent Application No. 19162451.9.

*Primary Examiner* — Philip P. Dang
(74) *Attorney, Agent, or Firm* — Cowan, Liebowitz & Latman, P.C.

(57) ABSTRACT

Provided is a display control apparatus to perform operations of units including a display control unit configured to display a partial range of the wide visual field image and a control unit. The control unit changes the display range of the wide visual field image by rotating the display range clockwise or counterclockwise around the first axis in response to input of a moving operation in a first direction or in a second direction opposite to the first direction. The control unit changes the display range by rotating the display range in a rotation direction around the first axis in response to input of a moving operation in the first direction, wherein the rotation direction differs based on a positional relationship between a start point of the moving operation and the center position with respect to a axis direction vertical to the first direction.

18 Claims, 10 Drawing Sheets

(51) Int. Cl.
  *H04N 13/349* (2018.01)
  *H04N 5/232* (2006.01)
  *G06F 3/0481* (2013.01)
  *G06F 3/0484* (2013.01)
  *G06F 3/0488* (2013.01)
  *G06F 3/0485* (2013.01)
  *G06F 3/033* (2013.01)

(52) U.S. Cl.
  CPC ...... *G06F 3/04845* (2013.01); *G06F 3/04883* (2013.01); *H04N 5/23238* (2013.01); *H04N 13/349* (2018.05); *G06F 3/033* (2013.01); *G06F 3/0488* (2013.01)

(58) Field of Classification Search
  CPC .. H04N 21/431; H04N 21/4728; H04N 7/181; G06T 3/00; G06T 17/00; G06T 13/20; G06T 1/0007; G06T 2207/10016; G06T 3/60
  USPC .................................. 348/36–61, 142–160
  See application file for complete search history.

(56) References Cited

U.S. PATENT DOCUMENTS

| | | | |
|---|---|---|---|
| 8,269,692 B2* | 9/2012 | Sugiyama | G02B 27/0172 345/7 |
| 9,186,578 B2* | 11/2015 | Sato | A63F 13/26 |
| 9,392,167 B2* | 7/2016 | Shohara | G06T 15/205 |
| 9,741,091 B2* | 8/2017 | Satori | H04N 21/431 |
| 9,826,136 B2* | 11/2017 | Akaishi | H04N 5/23299 |
| 9,870,144 B2* | 1/2018 | Karoji | G05B 15/02 |
| 10,203,762 B2* | 2/2019 | Bradski | H04N 13/366 |
| 10,222,903 B2* | 3/2019 | Ishitsuka | H04N 5/23216 |
| 10,341,834 B2* | 7/2019 | Lee | G06F 3/0488 |
| 10,408,613 B2* | 9/2019 | Abovitz | G02B 6/10 |
| 10,419,655 B2* | 9/2019 | Sivan | G06F 3/013 |
| 10,527,836 B2* | 1/2020 | Sakamoto | G02B 21/367 |
| 10,641,603 B2* | 5/2020 | Abovitz | G06F 3/005 |
| 2012/0224062 A1* | 9/2012 | Lacoste | G02B 27/01 348/148 |
| 2013/0063384 A1* | 3/2013 | Ito | G06F 3/0485 345/173 |
| 2014/0022539 A1* | 1/2014 | France | G01S 19/48 356/139.1 |
| 2014/0176542 A1* | 6/2014 | Shohara | G06T 15/205 345/420 |
| 2017/0052752 A1 | 2/2017 | Ogawara | |
| 2017/0169540 A1* | 6/2017 | Satori | H04N 21/278 |
| 2017/0269346 A1* | 9/2017 | Sakamoto | G01B 5/004 |
| 2018/0150989 A1* | 5/2018 | Mitsui | G06T 13/20 |
| 2019/0154439 A1* | 5/2019 | Binder | G01S 15/08 |
| 2019/0199995 A1* | 6/2019 | Yip | G06T 3/00 |
| 2020/0007845 A1* | 1/2020 | Fukuyasu | H04N 5/23238 |

* cited by examiner

DISPLAY CONTROL APPARATUS AND CONTROL METHOD

BACKGROUND OF THE INVENTION

Field of the Invention

The present invention relates to a display control apparatus, and a control method, a program and a storage medium therefor.

Description of the Related Art

A technique that is becoming common is mapping an image captured by an omni-azimuth camera (omni-directional camera) onto the surface of a virtual sphere, so as to display an image as if viewing the image mapped onto the surface of the sphere from a viewpoint located at the center of the sphere. Hereafter an image mapped onto a virtual spherical surface is called a "wide visual field image". An available technique to display a wide visual field image is a technique of changing a range of the wide visual field image to be displayed on the display, in accordance with a user input operation using a pointing device, attitude information of a head mount display and the like. Japanese Patent Application Publication NO. 2017-107549 discloses a technique in which a display region of the display is divided into a plurality of sub-regions, a wide visual field image acquired by imaging using an omni-directional camera is displayed on each sub-region, and display control, which is different depending on each sub-region, is performed.

SUMMARY OF THE INVENTION

In the case where a wide visual field image is displayed, if the user performs a moving operation in the rightward direction (e.g. slide operation (Touch Move) on the touch panel, drag operation using a mouse), for example, the image displayed on the display moves to the fight following the operation by the user. This display is implemented by changing the range of the wide visual field image that is displayed on the display, assuming that the virtual sphere, on which the wide visual field image is mapped, is rotated in the state of fixing the line of sight. The display following the user operation may also be implemented by changing the range of the wide visual field image that is displayed on the display, assuming that the direction of the line of sight is changed according to the user operation fixing the wide visual field range (virtual sphere).

In the conventional display control of the wide visual field image, the rotating direction of the wide visual field image, with respect to the operation direction by the user, is univocally determined. For example, if the user performs a moving operation to the right, the range of the wide visual field image that is displayed on the display is changed, assuming that the wide visual field image (virtual sphere) is rotated clockwise with respect to the vertical direction, regardless of the touch position.

However, if this display control is performed, in some cases the display may not follow the user operation, when the range, including the vertex (zenith or nadir) of the wide visual field image in the vertical direction is displayed on the display. For example, it is assumed that in the state where the display range includes the nadir of a wide visual field image is included in the display range, the user performs a slide operation to the right from a start position that below the position of the nadir. In this case, if the range of the wide visual field image, that is displayed on the display, is changed by rotating the wide visual field image clockwise with respect to the vertical axis, as mentioned above, the image displayed on the display moves to the left. This is because when the wide visual field image (virtual sphere) rotates clockwise, viewing from the top in the vertical direction, the side that is deeper than the nadir (lower side from the nadir in the image display region) moves to the right, the side closer to the user (upper side from the nadir in the image display region) moves to the left. This means that the image moves in the opposite direction from the operation to the right performed by the user. In this way, depending on the start position of the slide operation, the moving direction of the pointing device and the moving direction of the display image become the same or the opposite. This inconsistent relationship of the directions may irritate the user.

With the foregoing in view, it is an object of the present invention to provide a technique to prevent a sense of irritation the user may experience when the user performs an operation to move the display range of the wide visual field image in the display control apparatus that controls the display of the wide visual field image.

It is provided with a view to achieving one aspect as describe above a display control apparatus, including:

an input unit configured to receive input of a position in a display region of a wide visual field image displayed on a display unit; and a memory and at least one processor and/or at least one circuit to perform operations of units including:

a display control unit configured to control display of the wide visual field image so as to display a partial range of the wide visual field image on the display unit; and a control unit configured to perform:

changing, in a first state that the partial range of the wide visual field image is displayed as a display range and a center position of a rotation around a first axis is not included in the display range, the display range of the wide visual field image by rotating the display range clockwise around the first axis in response to input of a moving operation in a first direction with respect to the display region received by the input unit;

changing, in the first state, the display range of the wide visual field image by rotating the display range counterclockwise around the first axis in response to input of a moving operation in a second direction opposite to the first direction with respect to the display region received by the input unit; and changing, in a second state that the partial range of the wide visual field image is displayed as the display range and the center position of the rotation around the first axis is included in the display range, the display range of the wide visual field image by rotating the display range in a rotation direction around the first axis in response to input of a moving operation in the first direction with respect to the display region received by the input unit, wherein the rotation direction differs based on a positional relationship between a start point of the moving operation and the center position with respect to a axis direction vertical to the first direction.

According to the present invention, in the display control apparatus that controls the display of the wide visual field image, the sense of irritation the user may experience when the user performs an operation to move the display range of the wide visual field image can be prevented.

Further features of the present invention will become apparent from the following description of exemplary embodiments with reference to the attached drawings.

DESCRIPTION OF THE EMBODIMENTS

Preferred embodiments of the present invention will now be described with reference to the drawings. Here an example of applying the present invention to a display control apparatus, which performs a control to display a wide visual field image on a display unit, will be described.

A wide visual field image is an image having information on an object (image information) in a range of a viewing angle of at least 180° (±90°) in the vertical direction (vertical angle, angle from the zenith, elevation angle, depression angle, altitude angle) and in the horizontal direction (horizontal angle, azimuth angle) respectively. The valid image range (video range) of the wide visual field image is at maximum a 360° in the vertical direction and a 360° in the horizontal direction, but an image of which valid image range is less than 360° in the vertical direction and less than 360° in the horizontal direction is included in the wide visual field image. For example, an image of which valid image range is 360° in the horizontal direction (horizontal angle, azimuth angle) and 210° centered around the zenith in the vertical direction, is a wide visual field image. A wide visual field image is an image having a wider viewing angle than the range which an individual can visually recognize at a time, and is an image which has image information on an angle of view (viewing angle) that is wider than the angle of view of an image acquired by a conventional camera. The wide visual field image is also an image having an image information in a video range that is wider than a video range that can be displayed on the display unit at one time. The present invention can be applied to a display control apparatus that controls display of a wide visual field image having image information which includes at least a vertex of the zenith, (or straight up), or a vertex of the nadir (or straight down) on the opposite side of the zenith.

The wide visual field image includes an omni-directional image, an omni-azimuth image, a panorama video image, a VR image and the like having a viewing angle of at least 180°, which are captured by an omni-directional camera or an omni-azimuth camera. Besides these images captured by cameras, a VR image and the like having a viewing angle of at least 180°, which are created using computer graphics (CG), are also included in the wide visual field image. Further, not only still images but also moving images and live view images, which are acquired from, an imaging apparatus in near real-time, are included in the wide visual field image.

Figure 1A:
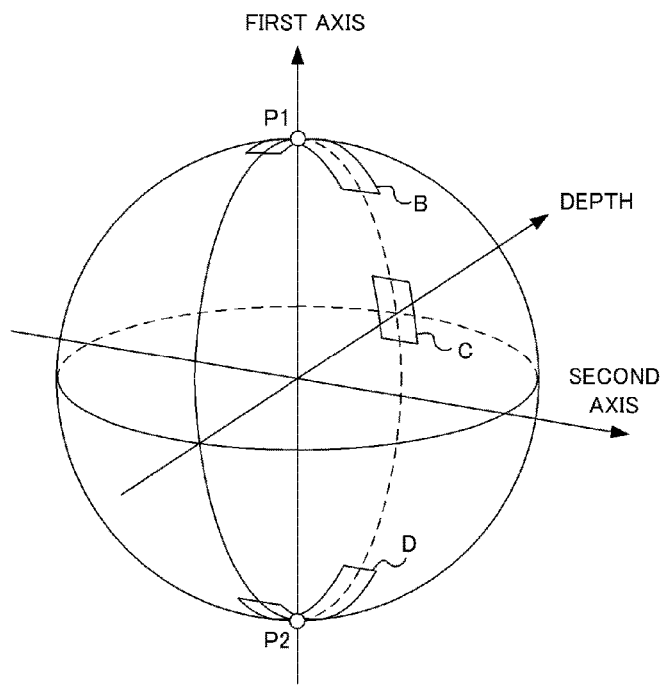
FIGS. 1A to 1D are diagrams depicting a wide visual field image.

FIGS. 1A to 1D are diagrams depicting a wide visual field image to be displayed by a display control apparatus of Example 1. In the display control of the wide visual field, an omni-directional image (omni-azimuth image) based on the equidistant cylindrical projection, acquired by an omni-directional camera, for example, is mapped onto a surface of a virtual sphere, as illustrated in FIG. 1A. Then a partial range of the wide visual field image is displayed on a display as if the spherical surface were viewed from the viewpoint located at the center of the sphere, whereby a VR image display is implemented, for example.

According to the display control of the wide visual field image, in the case where the direction of the line of sight and the visual field (range) to view the surface of the virtual sphere are used as the reference (fixed) and the vertical sphere is rotated in this state, the display image is changed so that the change of the image, which is viewed from a viewpoint located at the center of the virtual sphere, is displayed on the display.

This display control may be interpreted such that when the direction of the line of sight and the visual field (range) to view the surface of the virtual sphere are changed using (fixing) the virtual sphere as a reference, the display image is changed so that the change of the image, which is viewed from a viewpoint located at the center of the virtual sphere, is displayed on the display.

Such concepts as the "rotation of the light of sight" and the "rotation of the virtual sphere" are to describe the display control of the image, and are not intended to restrict a concrete calculation method, such as coordinate transformation, to implement "display as if the line of sight were rotated" or "display as if the virtual sphere were rotated".

In this description, the "wide visual field image" refers to an original image mapped onto the virtual sphere based on an equidistant cylindrical projection or the like, as described above. The "rotation of the wide visual field image" refers to changing the range of the wide visual field image displayed on the display by rotating the virtual sphere on which the wide visual field image is mapped. Further, the "rotation of the display range of the wide visual field image" refers to changing a partial range of the wide visual field image to be displayed on the display by changing the direction of the line of sight and the visual field (range) to view the wide visual field image using (fixing) the wide visual field image (virtual sphere) as a reference.

As illustrated in FIG. 1A, the wide visual field image is an image of a predetermined range of the visual field in a first axis direction and a second axis direction, which is perpendicular to the first axis, and the predetermined range includes at least one of a vertex in the positive direction of the first axis (first vertex) and a vertex in the negative direction of the first axis (second vertex). In FIGS. 1A to 1D, the first axis is the vertical axis and the positive direction of the first axis is upward, and the negative direction thereof is downward. The second axis is the horizontal axis, the positive direction of the second axis is to the right, and the negative direction thereof is to the left. The vertex in the positive direction of the first axis (first vertex) is the zenith P1, and the vertex in the negative direction thereof (second vertex) is the nadir P2. The vertex in the positive direction of the first axis (zenith or straight up) and the vertex in the negative direction of the first axis (nadir or straight down) are center positions of the rotation around the first axis.

The display control apparatus displays a partial range of this wide visual field image on the display device. In FIG. 1A, the display range B indicates a range that includes a first vertex (zenith) P1, which is the vertex in the positive direction (upward) of the first axis. The display range C indicates a range of the wide visual field image, that includes neither the vertex (zenith) P1 in the positive direction (upward) of the first axis nor the vertex (nadir) P2 in the negative direction (downward) thereof. The display range D indicates a range of the wide visual field image, which includes the second vertex (nadir) P2, which is the vertex in the negative direction (downward) of the first axis.

The display control apparatus receives input by the user to instruct operation on the wide visual field image displayed on the display unit. In the case where a moving operation in the second axis direction (horizontal direction) input to the input unit, the display control apparatus performs a control to change the display range of the wide visual field image displayed on the display unit by rotating the wide visual field image around the first axis (around the vertical axis).

Figure 1B:
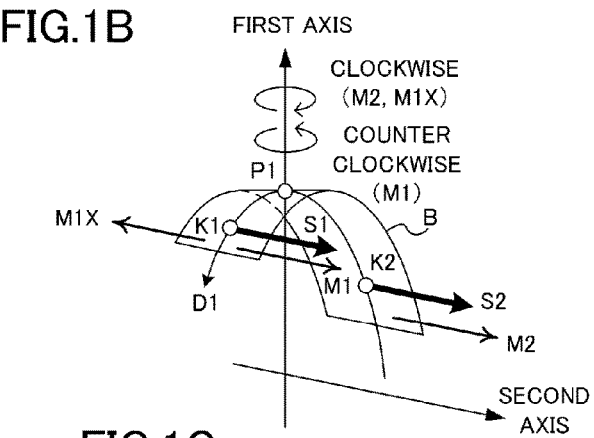

FIG. 1B is an enlarged view of the display range B, to describe the rotation direction of the wide visual field image when the user inputs the moving operation in a state where the display range B is displayed on the display unit. FIG. 1B indicates a state where a partial range of the wide visual field image, that includes the first vertex (zenith) P1, is displayed on the display unit.

It is assumed that the user inputs the moving operation S1 in the positive direction (rightward direction) of the second axis starting from a first point K1, which is at a positive side of the first vertex (zenith) P1 in the first axis direction (vertical direction) D1. In this case, the display control apparatus changes the display range of the wide visual field image to be displayed on the display unit by rotating the wide visual field image counterclockwise M1 around the first axis. Then the display range of the wide visual field image rotates clockwise around the first axis, and the display image on the positive side of the first vertex (zenith) P1 in the first axis direction (vertical direction) D1 on the display unit moves to the right. The display image on the negative side of the first vertex (zenith) P1 in the first axis direction (vertical direction) D1 moves to the left. On the other hand, if the user inputs the moving operation in the negative direction (leftward) of the second axis starting from the first point K1 (opposite of S1), the display control apparatus changes the display range of the wide visual field image to be displayed on the display unit by rotating the wide visual field image clockwise around the first axis (opposite of M1). Then the display range of the wide visual field image rotates counterclockwise around the first axis, and the display image on the positive side of the first vertex (zenith) P1 in the first axis direction (vertical direction) D1 on the display unit moves to the left. The display image on the negative side of the first vertex (zenith) P1 in the first axis direction (vertical direction) D1 moves to the right. The first point K1 is at a position on the third direction side (upward), which is vertical to the first direction and the second direction (horizontal direction with respect to the display direction of the image on the display unit) from the first vertex (zenith) P1. The first axis is an axis which is parallel with the third direction and the fourth direction (vertical direction) that is in the opposite direction of the third direction.

If the user inputs the moving operation S2 in the positive direction (rightward direction) of the second axis starting from the second point K2, which is located at a negative position of the first vertex (zenith) P1 in the first axis direction (vertical direction) D1, the display control apparatus performs control as follows. First the display control apparatus changes the display range of the wide visual field image to be displayed on the display unit by rotating the wide visual field image clockwise M2 around the first axis. Then the display range of the wide visual field image rotates counterclockwise around the first axis, and the display image on the negative side of the first vertex (zenith) P1 in the first axis direction (vertical direction) D1 on the display unit moves to the right. The display image on the positive side of the first vertex (zenith) P1 in the first axis direction (vertical direction) D1 moves to the left. On the other hand, if the user inputs the moving operation in the negative direction (leftward) of the second axis, starting from the second point K2 (opposite of S2), the display control apparatus changes the display range of the wide visual field image to be displayed on the display unit by rotating the wide visual field image counterclockwise around the first axis (opposite of M2). Then the display range of the wide visual field image rotates clockwise around the first axis, and the display image on the negative side of the first vertex (zenith) P1 in the first axis direction (vertical direction) D1 on the display unit moves to the left. The display image on the positive side of the first vertex (zenith) P1 in the first axis direction (vertical direction) D1 moves to the right. The second point K2 is at a position on the fourth direction side (downward) of the first vertex (zenith) P1, which is an opposite direction from the third direction (upward), which is vertical to the first direction and the second direction (horizontal direction with respect to the display direction of the image on the display unit). The first axis is an axis which is parallel with the third direction and the fourth direction (vertical direction), that is in an opposite direction from the third direction.

As illustrated in FIG. 1B, in either case the operating directions (S1, S2) by the user and the rotating directions (M1, M2) of the wide visual field image match, and the operating direction by the user and the moving direction of the operated portion of the display image on the display unit match. Therefore, even if the user performs the moving operation in a state where the range of the wide visual field image, including the zenith, is displayed on the display unit, the sense of irritation that the user experiences can be prevented.

Conventionally if a moving operation to the right is input, for example, in a state where the range of the wide visual field image, including the zenith P1, is displayed on the display unit, the following display control is performed. That is, the wide visual field image is always rotated clockwise around the first axis, regardless of the start position of the moving operation, whereby the display range of the wide visual field image displayed on the display unit is changed. Therefore, if the moving operation S1 to the right, starting from the first point K1, which is located above the zenith P1 is input, the operating direction S1 and the rotating direction M1X of the wide visual field image become the opposite, as illustrated in FIG. 1B. In other words, the operating direction by the user and the moving direction of the operated portion of the display image on the display unit do not match. In this case, the image moves to the left in a portion in which the user performs the Touch-Move operation to the right, for example, therefore the user may experience a sense of irritation.

Here the "position on the positive side of the first vertex P1 in the first axis direction D1" refers to the position that is distant from the first vertex P1 in the direction indicated by the arrow D1. The "position on the negative side of the first vertex P1 in the first axis direction D1" refers to the position that is distant from the first vertex P1 in the direction opposite from the direction indicated by the arrow D1. As illustrated in FIG. 1B, the "positive direction in the first axis direction" indicated by the arrow D1 is the counterclockwise direction around the second axis (around the horizontal axis). However, in the image displayed on the display unit, the direction indicated by the arrow D1 is the vertical direction, and the first point K1 is displayed above the first vertex P1. Therefore, the position of the first point K1 is expressed as a position on the positive side of the first vertex P1 in the first axis direction (vertical direction). This may be described as follows. In the case where the line of sight is moved toward the zenith in the state of facing the wide visual field image in the horizontal direction, that is, in the state of the display range C being displayed on the display unit, the line of sight moves in the direction indicated by the arrow D1. In the state of facing the wide visual field image in the horizontal direction, the direction indicated by the arrow D1 (counterclockwise direction around the second axis) is parallel with the vertical direction. Therefore, in the image displayed on the display unit, the direction indicated by the arrow D1 is recognized as the vertical direction.

Figure 1C:
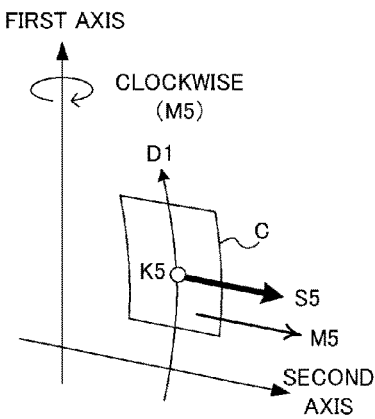

FIG. 1C is an enlarged view of the display range C, to describe the rotating direction of the wide visual field image when the user inputs the moving operation in a state where the display range C is displayed on the display unit. FIG. 1C indicates a state where a range of the wide visual field range, that includes neither the first vertex (zenith) P1 nor the second vertex (nadir) P2, is displayed on the display unit.

When the moving operation S5 in the positive direction (rightward direction) of the second axis is input in this state, the display control apparatus changes the display range of the wide visual field image to be displayed on the display unit by rotating the wide visual field image clockwise M5 around the first axis. Then the display range of the wide visual field image rotates counterclockwise around the first axis, and the display image on the display unit moves to the right. On the other hand, when the moving operation in the negative direction (leftward) of the second axis (opposite of S5) is input, the display control apparatus changes the display range of the wide visual field image to be displayed on the display unit by rotating the wide visual field image counterclockwise around the first axis (opposite of M5). Then the display range of the wide visual field image rotates clockwise around the first axis, and the display image on the display unit moves to the left.

As illustrated in FIG. 1C, the operating direction S5 by the user and the rotating direction M5 of the wide visual field image match, and the operating direction by the user and the moving direction of the display image on the display unit match.

Figure 1D:
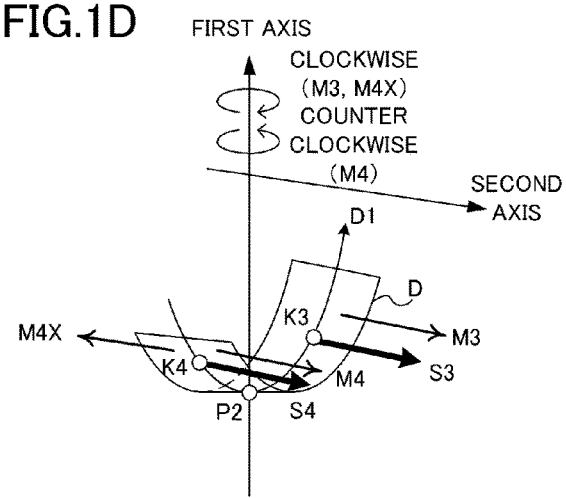

FIG. 1D is an enlarged view of the display range D, to describe the rotating direction of the wide visual field image when the user inputs the moving operation in a state where the display range D is displayed on the display unit. FIG. 1D indicates a state where a range of the wide visual field image, that includes the second vertex (nadir) P2, is displayed on the display unit.

It is assumed that the user inputs the moving operation S3 in the positive direction (rightward direction) of the second axis, starting from a third point K3, which is at a positive side of the second vertex (nadir) P2 in the first axis direction (vertical direction) D1. In this case, the display control apparatus changes the display range of the wide visual field image to be displayed on the display unit by rotating the wide visual field image clockwise M3 around the first axis. Then the display range of the wide visual field image rotates counterclockwise around the first axis, and the display image on the positive side of the second vertex (nadir) P2 in the first axis direction (virtual direction) D1 on the display unit on the display unit moves to the right. The display image on the negative side of the second vertex (nadir) P2 in the first axis direction (vertical direction) D1 moves to the left. On the other hand, if the user inputs the moving operation in the negative direction (leftward) of the second axis, starting from the third point K3 (opposite of S1), the display control apparatus changes the display range of the wide visual field image to be displayed on the display unit by rotating the wide visual field image counterclockwise around the first axis (opposite of M3). Then the display range of the wide visual field image rotates clockwise around the first axis, and the display image on the positive side of the second vertex (nadir) P2 in the first axis direction (vertical direction) D1 on the display unit moves to the left. The display image on the negative side of the second vertex (nadir) P2 in the first axis direction (vertical direction) D1 on the display unit moves to the right. The third point K3 is at a position on the third direction side (upward), which is vertical to the first direction and the second direction (horizontal direction with respect to the display direction of the image on the display unit) from the second vertex (nadir) P2. The first axis is an axis which is parallel with the third direction and the fourth direction (vertical direction), that is in the opposite direction from the third direction.

It is assumed that the user inputs the moving operation S5 in the positive direction (rightward direction) of the second axis, starting from the fourth point K4, which is at a position on the negative side of the second vertex (nadir) P2 in the first axis direction (vertical direction) D1. In this case, the display control apparatus changes the display range of the wide visual field image to be displayed on the display unit by rotating the wide visual field image counterclockwise M4 around the first axis. Then the display range of the wide visual field image rotates clockwise around the first axis, and the display image on the negative side of the second vertex (nadir) P2 in the first axis direction (vertical direction) D1 on the display unit moves to the right. The display image on the positive side of the second vertex (nadir) P2 in the first axis direction (vertical direction) D1 moves to the left. On the other hand, if the user inputs the moving operation in the negative direction (leftward) of the second axis, starting from the fourth point K4 (opposite of S4), the display control apparatus changes the display range of the wide visual field image to be displayed on the display unit by rotating the wide visual field image clockwise around the first axis (opposite of M4). Then the display range of the wide visual field image rotates counterclockwise around the first axis, and the display image on the negative side of the second vertex (nadir) P2 in the first axis direction (vertical direction) D1 on the display unit moves to the left. The display image on the positive side of the second vertex (nadir) P2 in the first axis direction (vertical direction) D1 moves to the right. The fourth point K4 is at a position on the fourth direction side (downward) which is the opposite direction from the third direction (upward), which is vertical to the first direction and the second direction (horizontal direction with respect to the display direction of the image on the display unit) from the second vertex (nadir) P2. The first axis is an axis which is parallel with the third direction and the fourth direction (vertical direction), that is in the opposite direction from the third direction.

As illustrated in FIG. 1D, the operating directions (S3, S4) by the user and the rotating directions (M3, M4) of the wide visual field image match respectively, and as mentioned above, the operating direction by the user and the moving direction of the operated portion of the display image on the display unit match. Therefore, even if the user performs the moving operation in a state where the range of the wide visual field image including the nadir is displayed on the display unit, the sense of irritation that the user experiences can be prevented.

Conventionally if a moving operation to the right is input, for example, in a state where the range of the wide visual field image, including the nadir P2, is displayed on the display unit, the following display control is performed. That is, the wide visual field image is always rotated clockwise around the first axis, regardless of the start position of the moving operation, whereby the display range of the wide visual field image displayed on the display unit is changed. Therefore, if the moving operation S4 to the right, starting from the fourth point K4 located bellow the nadir P2, is input, the operating direction S4 and the rotating direction M4X of the wide visual field image become the opposite, as illustrated in FIG. 1D. In other words, the operating direction by the user and the moving direction of the operated portion of the display image on the display unit do not match. In this case, the image moves to the left in a portion where the user performs a Touch-Move operation to the right, for example, therefore the user may experience the sense of irritation.

In the case where a range, including the zenith P1, is displayed, the display range of the wide visual field image displayed on the display unit is changed by rotating the wide visual field image in opposite directions M1 and M2 depending on whether the start point of the moving operations S1 and S2 in the horizontal direction is above or below the zenith P1. As a result, in the case where the range, including the zenith P1, is displayed, the direction of the moving operation by the user and the moving direction of the image displayed on the display unit match, regardless of whether the start point of the moving operation S1 and S2 in the horizontal direction is above or below the zenith P1.

In the case where a range, including the nadir P2, is displayed, the display range of the wide visual field displayed on the display unit is changed by rotating the wide visual field image in opposite directions M3 and M4 depending on whether the start point of the moving operations S3 and S4 in the horizontal direction is above or below the nadir P2. As a result, in the case where the range, including the nadir P2, is displayed, the direction of the moving operation by the user and the moving direction of the image displayed on the display unit match, regardless of whether the start point of the moving operations S3 and S4 in the horizontal direction is above or below the nadir P2.

In response to the moving operation input by the user, the display control apparatus performs a control of moving the wide visual field image displayed on the display unit. If the vertex (zenith or nadir) of the wide visual field image is included in a range displayed on the display unit in this control, the display control apparatus processes as follows. The processing is performed such that the moving direction of the wide visual field image, that is generated on the display unit responding to the moving operation in a first direction input by the user, establishes a predetermined relationship with the first direction, at least at a position where the moving operation is performed, regardless of the positional relationship between the start point of the moving operation and the zenith or the nadir, "Establishing a predetermined relationship with the first direction" refers to, for example, having a same direction as the first direction, or having an opposite direction from the first direction. Here the moving direction of the wide visual field image and the direction of the moving operation by the user establish a predetermined relationship, at least at a position where the moving operation is performed. Thereby at the position where the user performed the moving operation, the wide visual field image always moves in a direction having a predetermined relationship with the moving operation direction, regardless of the position of the start point of the moving operation. For example, at a position where the user performed the Touch-Move operation, the e visual field image always moves in the same direction as the direction of the Touch-Move operation, regardless of the Touch-Down position, that is, the start point of the Touch-Move operation.

To implement this display, the display control apparatus performs the display control using the following method. If the moving operation in the second axis direction (horizontal direction) is input when a range including the vertex is being displayed, the direction of rotating the wide visual field image that is rotated around the first axis is determined in accordance with the positional relationship of the start point of the moving operation and the vertex in the first axis direction (vertical direction).

Thereby if the user performs the moving operation in a state where a range including the vertex of the wide visual field image is being displayed, the direction of the moving operation and the moving direction of the image displayed on the display unit have a predetermined relationship, regardless of the position of the start point of the moving operation. Since the image displayed on the display unit moves in the direction intended by the user, regardless of the position of the start point of the moving operation, the sense of irritation that the user experience when the moving operation is performed can be prevented.

When a range which does not include the vertexes P1 and P2 is being displayed, the display control apparatus changes the display range of the wide visual field image displayed on the display unit by rotating the wide visual field image in the direction M5 corresponding to the direction of the moving operation, regardless of the position of the start point K5 of the moving operation S5 in the horizontal direction. Since this matches the direction of the moving operation by the user and the moving operation of the image displayed on the display unit, the sense of irritation that the user experience when the moving operation is performed can be prevented.

A concrete example of applying the display control apparatus according to the present invention will be described with reference to the drawings.

Figure 2A:
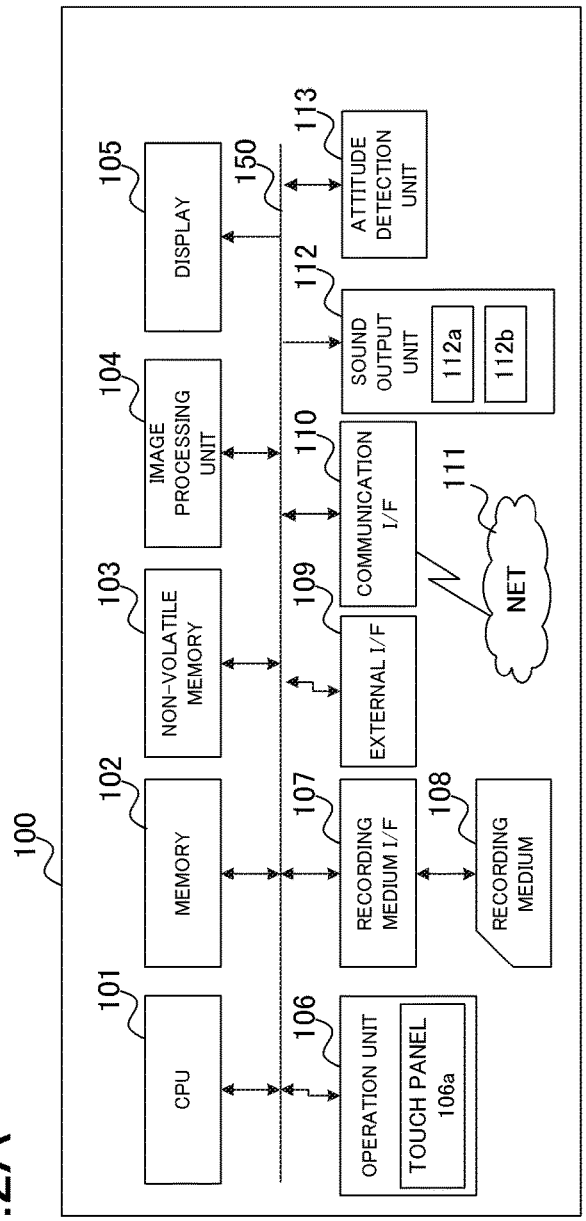
FIG. 2A is a block diagram depicting a general configuration of an electronic device 100.
Figure 2B:
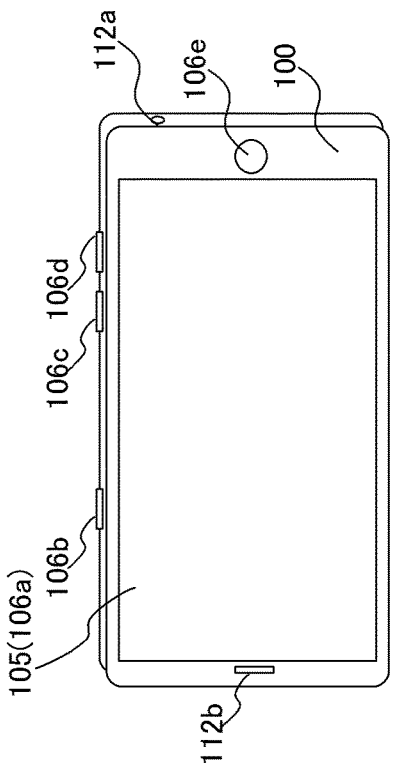
FIG. 2B is an external view thereof.

FIGS. 2A and 2B each indicate a general configuration of an electronic device 100 to which the display control apparatus according to the present invention is applied. The electronic device 100 is a smartphone or a computer, for example. The electronic device 100 can display a wide visual field image on a display 105.

As illustrated in FIG. 2A, in the electronic device 100, a CPU 101, a memory 102, a non-volatile memory 103, an image processing unit 104, a display 105, an operation unit 106, a recording medium I/F 107 and an external I/F 109 are connected to an internal bus 150. A communication I/F 110, a sound output unit 112 and an attitude detection unit 113 are also connected to the internal bus 150. Each unit connected to the internal bus 150 can exchange data with each other via the internal bus.

The CPU 101 is a control unit that controls the electronic device 100 in general, and is constituted by at least one processor. The memory 102 is constituted by a RAM (e.g. volatile memory using a semiconductor element), for example. The CPU 101 controls each unit of the electronic device 100 using the memory 102 as a work memory, according to a program stored in the non-volatile memory 103, for example. The non-volatile memory 103 stores such image data as image data, sound data, and various programs for the CPU 101 to execute. The non-volatile memory 103 is constituted by a flash memory or a ROM, for example. The CPU 101 controls the electronic device 100 by reading and executing a program stored in the recording medium (storage medium) 108.

The image processing unit 104 performs various image processing on image data stored in the non-volatile memory 103 and the recording medium 108, image data acquired via the external I/F 109, and image data acquired via the communication I/F 110. The image processing performed by the image processing unit 104 includes an A/D conversion processing, a D/A conversion processing, encoding processing of image data, compression processing, decoding processing, zoom in/zoom out (resiting) processing, noise reduction processing and color conversion processing. The image processing unit 104 also performs various processing on the wide visual field image. The image processing unit 104 also performs various image processing on an omni-directional image (omni-azimuth image) and a wide range image, such as a VR image which has data in a wide video image range viewing angle at least 180°), even if it is not an omni-directional image, and the image processing include panoramic expansion, mapping processing and conversion. The image processing unit 104 may be constituted of dedicated circuit blocks which have functions to perform a specific image processing. Depending on the type of the image processing, the CPU 101 may perform the image processing according to a program, without using the image processing unit 104.

The display 105 displays images and a GUI (graphic user interface) screen based on control of the CPU 101. The CPU 101 is a computer that generates image data to be displayed on the display 105 according to a program, and controls each unit of the electronic device 100 so as to output the display control signals to the display 105 based on the image data. The display 105 displays images based on the input display control signal. In this example, the electronic device 100 includes the display 105, but may include an interface to output the display control signal to an external display unit (e.g. TV, monitor), without including the display 105.

The operation unit 106 is an input unit that receives input of an operation instruction to the electronic device 100 from the user. The operation unit 106 is, for example, a text information input device (e.g. keyboard), a pointing device (e.g. mouse, touch panel), a button(s), a dial, a joystick, a touch sensor and a touch pad. The touch panel is a touch detection unit that detects the input of an instruction by the touch operation by the user, and is configured as a plane superimposed on the display 105. The touch panel detects a position touched by the user, and outputs information corresponding to the touch position. In Example 1, the operation unit 106 is an input unit which receives input of the operation instruction from the user, via a point device or the like, to instruction operation for a wide visual field image displayed on the display 105, which is a display unit.

The recording medium I/F 107 is an interface which can be used to insert or connect a recording medium (storage medium) 108, such as a memory card, CD and DVD. Based on the control by the CPU 101, the recording medium I/F 107 reads a program and data stored in the inserted or connected recording medium (storage medium) 108, or writes (stores) data to the recording medium 108.

The external I/F 109 is an interface that can connect an external device by cable or wirelessly. The external 109 exchanges various data, such as image data, sound data, files and commands, with the external device or the external network 111.

The sound output unit 112 outputs sounds generated by reproducing moving image data and music data, operation sounds, incoming sounds and various notification sounds. The sound output unit 112 includes a sound output unit 112a, to which an earphone or the like is connected, and a speaker 112b. The sound output unit 112 may output the sound via wireless communication.

The attitude detection unit 113 detects an attitude of the electronic device 100 with respect to the gravity direction. Based on the attitude detected by the attitude detection unit 113, the CPU 101 determines the direction (e.g. virtual, horizontal, up, down, diagonal) in which the electronic device 100 is held. The attitude detection unit 113 is configured by one or a combination of various sensors, such as an acceleration sensor, gyro-sensor, geo-magnetic sensor and azimuth sensor.

The operation unit 106 includes a touch panel 106a, which is a touch detection unit. The CPU 101 can detect the following operation or the state of the touch panel 106a.

A finger or a pen which was not touching the touch panel 106a touches the touch panel 106a, that is, touch started (hereafter "Touch-Down").

A finger or a pen is touching the touch panel 106a (hereafter "Touch-On")

A finger or a pen is moving and remains in the touching state (hereafter "Touch-Move").

A finger or a pen touching the touch panel 106a is released from the touch panel 106a, that is, touch is ended (hereafter "Touch-Up").

Nothing is touching the touch panel 106a (hereafter "Touch-Off").

When Touch-Down is detected, Touch-On is simultaneously detected. Touch-On is continuously detected unless Touch-Up is detected after Touch-Down. In the case where Touch-Move is detected, Touch-On is simultaneously detected. Even if Touch-On is detected as well, Touch-Move is not detected if the touch position is not moving. When Touch-Up of all the fingers and the pen is detected, Touch-Off is detected.

These operations, states and the coordinates of the position on the touch panel 106a (touch detection unit) where a finger or a pen is touching are notified to the CPU 101 via the internal bus 150. Based on the notified information, the CPU 101 determines which operation (touch operation) was performed on the touch panel 106a. In the case of Touch-Move, the moving direction of the finger or the pen, which moves on the touch panel 106a, can be determined for the vertical component and the horizontal component respectively based on the changes of the positional coordinates. If Touch-Move exceeding the predetermined distance is detected, the CPU 101 determines that a slide operation was performed. An operation of quickly moving a finger on the touch panel 106a for a certain distance in the touch state then releasing is called a "flick". In other words, a flick is an operation on the touch panel 106a of quickly moving then releasing with a finger. A flick is detected when Touch-Move, for at least a predetermined distance at a predetermined speed or more, is detected, and Touch-Up is detected thereafter (flick after a slide operation is determined). Further, a touch operation of touching a plurality of points (e.g. two points) simultaneously and moving the touch positions to be close together is called "Pinch-In", and a touch operation of moving the touching positions away from each other is called "Pinch-Out". Pinch-Out and Pinch-In are collectively called a "pinch operation" (or "pinch"). The touch panel 106a may be any type of touch panel, such as a resistive film type, a capacitive type, a surface acoustic wave type, an infrared type, an electromagnetic induction type, an image recognition type and an optical sensor type. There are types to detect touch by contacting the touch panel, and types to detect touch by the approach of a finger or a pen to the touch panel, but both types may be used.

FIG. 2B is a diagram depicting an example of an external view of the electronic device 100. The display 105 is a display unit on which images and various information are displayed. The display 105 is integrated with the touch panel 106a which is a touch detection unit, and can detect the touch operation on the display surface of the display 105. The operation unit 106 includes the operation units 106b, 106c, 106d and 106e. The operation unit 106b is a power button that receives the operation to switch the power of the electronic device 100 ON and OFF. The operation unit 106c and the operation unit 106d are volume buttons that adjust the volume of the sound output from the sound output unit 112. The operation unit 106e s a home button to input instructions to display a home screen on the display 105.

Figure 3:
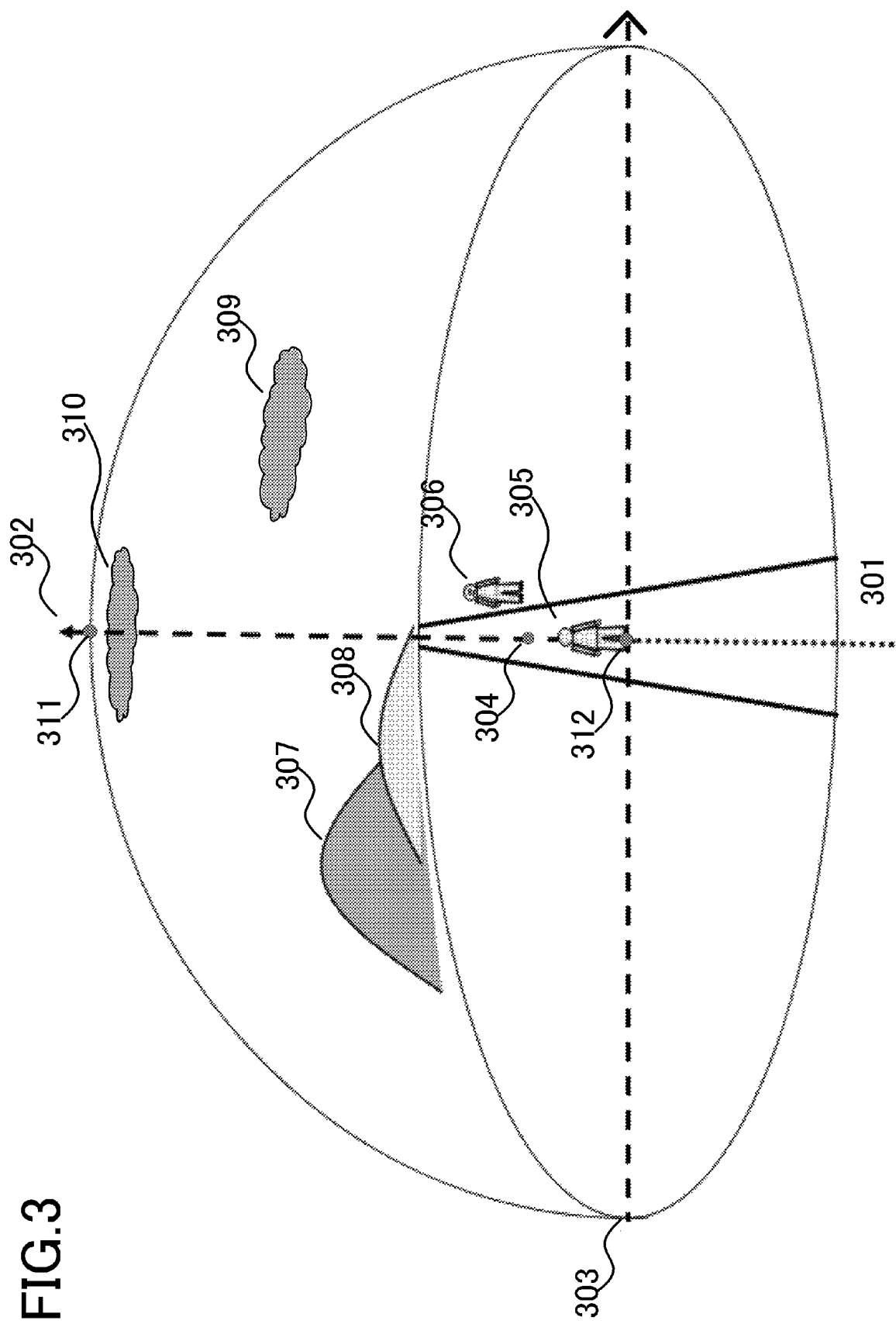
FIG. 3 is a diagram depicting a wide visual field image.

FIG. 3 is an example of a wide visual field image for which the electronic device 100, which is the display control apparatus of Example 1, performs display control. In the case of displaying a wide visual field image on the display 105, the CPU 101 of the electronic device 100 displays a range of the wide visual field image predetermined in the initial state. After displaying in the initial state, the CPU 101 receives input of the operation to change the range of the wide visual field image to be displayed on the display 105, and controls the range of the wide visual field to be displayed on the display 105 in accordance with the input operation.

In FIG. 3, the surface of a sphere, indicated as the wide visual field image 301, is a conceptual surface of a virtual sphere on which an original image is mapped, and this image is generated by an equidistant cylindrical projection, for example, and is acquired by imaging using an omni-directional camera (omni-azimuth camera) which can image the visual field in a 360° vertical direction and a 360° horizontal direction. The image format acquired by imaging using the omni-directional camera is not limited to an image based on the equidistant cylindrical projection, but may be based on the dual fisheye format, for example. The wide visual field image 301 is an image of a visual field in a predetermined range in the yaw axis 302 direction (vertical direction, up/down direction) which is the first axis, and the pitch axis 303 direction (upward/downward direction, leftward/rightward direction) which is the second axis, that is vertical to the first axis. The predetermined range of the wide visual field image of which display is controlled includes, at the least, a vertex in the positive direction (zenith) and a vertex in the negative direction (nadir) of the first axis. The vertex in the positive direction (zenith or straight up) of the first axis and the vertex in the negative direction (nadir or straight down) of the first axis are rotation center positions of the rotation around the first axis. In Example 1, the predetermined range is 360° in the vertical direction and 360° in the horizontal direction, and the wide visual field image 301 is the omni-directional image (omni-azimuth image) that includes both the zenith and the nadir.

In Example 1, the moving operation that is input to the input unit is a slide operation (Touch-Move) in the horizontal direction or the vertical direction input to the touch panel 106a. In Example 1, when the slide operation in the horizontal direction is input to the touch panel 106a, the CPU 101 changes the image to be displayed on the display 105 by rotating the virtual sphere, on which the wide visual field image 301 is mapped, around the yaw axis 302. This will be described later in detail in S406 and S408 in FIG. 4. When the slide operation in the virtual direction is input to the touch panel 106a, the CPU 101 changes the image to be displayed on the display 105 by rotating the virtual sphere, on which the wide visual field image 301 is mapped, around the pitch axis 303. This will be described in detail later in S410 and S412 in FIG. 4.

The imaging position 304 indicates a position of the camera which captured the wide visual field image 301.

An individual 305 is at a position on the nadir side of the imaging position 304, and the individual 305 is standing at a position where the yaw axis 302 and the pitch axis 303 cross. The individual 305 is facing an individual 306, and FIG. 3 is a view from the back side of the individual 305. A cloud 309 is located at the upper right in front of the individual 305. A cloud 310 is above the individual 305.

The zenith 311 is a vertex of the wide visual field image 301 in the positive direction (upward) of the first axis, and is at the right above the imaging position 304. The zenith 311 (straight up) is at the center position of the rotation around the first axis. The nadir 312 is a vertex of the wide visual field image 301 in the negative direction (downward) of the first axis, and is at the bottom of the imaging position 304. The nadir 312 (straight down) is at the center position of the rotation around the first axis.

Example 1

The operation of the electronic device 100 according to Example 1 of the present invention will be described with reference to FIG. 4 to FIGS. 8A to 8H.

The characteristic of Example 1 is the display control in the state where the range of the wide visual field image 301, including the zenith 311 or the nadir 312, which is a vertex in the first axis direction, is displayed on the display 105. In other words, the characteristic thereof is the display control in the case when the moving operation in the horizontal direction (second axis direction) is input to the touch panel 106a. The CPU 101 performs the display control to change the display range of the wide visual field image displayed on the display unit by rotating the wide visual field image 301 around the first axis. The CPU 101 determines the direction of rotating the wide visual field image 301 around the first axis in accordance with the positional relationship between the start point (Touch-Down position) of the slide operation which is the moving operation in the horizontal direction, and the vertex (the zenith 311 or the nadir 312) in the first axis direction (vertical direction). In concrete terms, the CPU 101 performs the following control when the zenith 311 or the nadir 312 is included in the display range. That is, the CPU 101 determines where the Touch-Down position, which is the start point of the slide operation, is located above or below the zenith 311 or the nadir 312, and determines the rotating direction of the wide visual field image 301.

Figure 4:
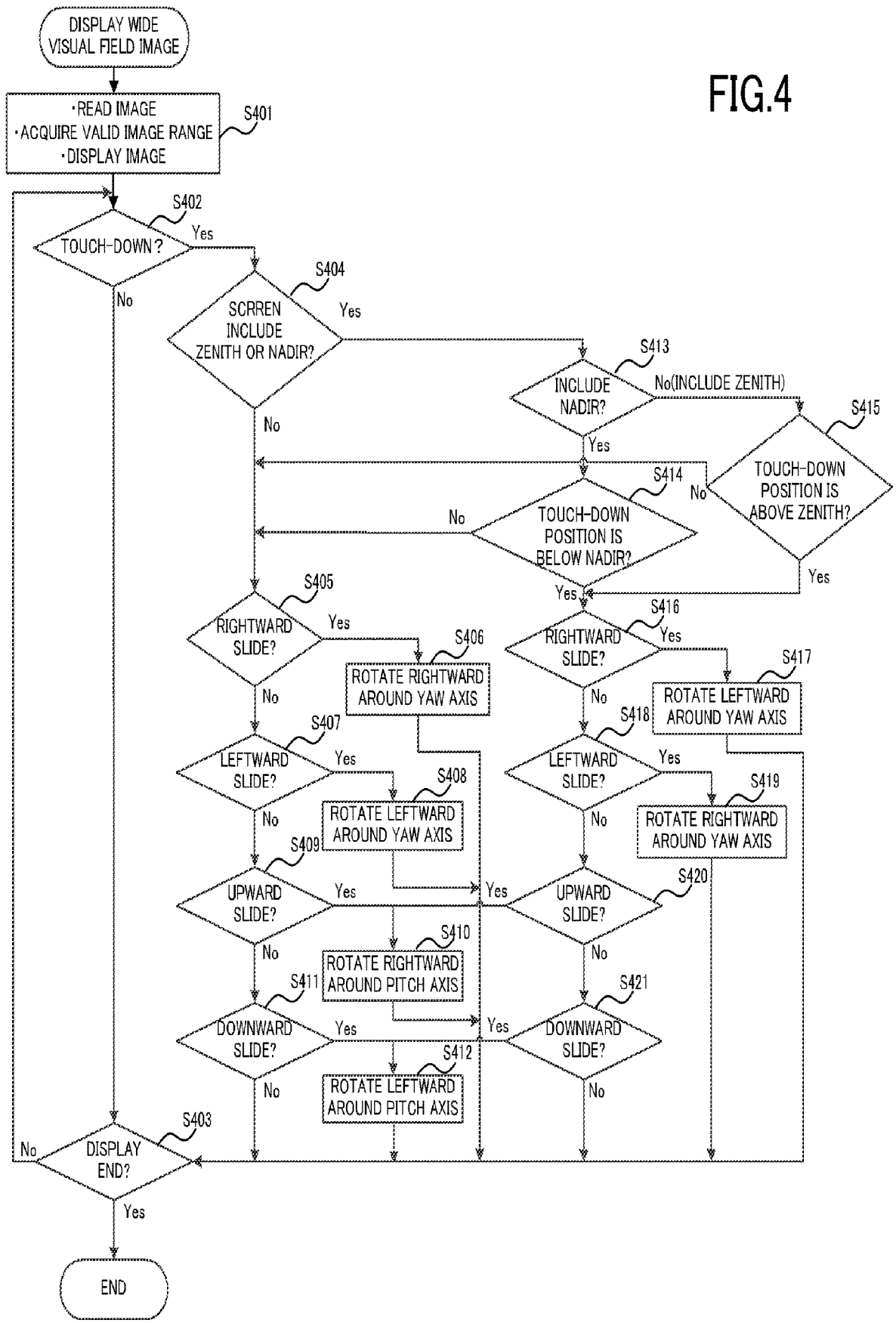
FIG. 4 is a flow chart depicting a wide visual field image display processing.

FIG. 4 is a flow chart depicting the processing flow of the display control of the wide visual field image performed by the electronic device 100 of Example 1. The processing of this flow chart is implemented by developing the program recorded in the non-volatile memory 103 to the memory 102, and the CPU 101 executing this program. When the power of the electronic device 100 is turned ON and an instruction, to acquire a wide visual field image data from the recording medium (storage medium) 108 or the external network 111, and display the acquired wide visual field image data on the display 105, is input, the processing in the flow chart in FIG. 4 starts.

In S401, the CPU 101 acquires the image data of the wide visual field image from the recording medium 108 or the external network 111 via the communication LIE 110, and displays a part of the wide visual field image on the display 105. The CPU 101 acquires information to indicate a valid image range, which accompanies the image data of the wide visual field image as the attribute information. This information to indicate the valid image range is information on the range (viewing angle) of the image in the vertical and the horizontal directions, out of the wide visual field image. The information to indicate the valid image range may be any information that can specify the valid image range of the wide visual field image. For example, the information to indicate the valid image range may include the angle information expressed by the angle of view, the angle of visibility, the azimuth angle, the elevation angle, the depression angle, the altitude angle and the steradian, and the position information expressed by a number of pixels and coordinates in the vertical direction and the horizontal direction. The information to indicate the valid image range may include the information on the camera which captured the wide visual field image, such as information on the model of the camera associated with the information on the imageable range, and the optical information (zoom ratio, angle of view of lens) used for the imaging. When the information to indicate the valid image range is received, the CPU 101 calculates the difference between the 360° vertical direction or the 360° horizontal direction and the valid image range, so as to acquire an invalid image range (non-image range). The CPU 101 may acquire the information to indicate the invalid image range from the attribute information of the wide visual field image, and calculate the valid image range based on this information, or may acquire both the information to indicate the valid image range and the information to indicate the invalid image range from the attribute information of the wide visual field image.

The original image (image data) of the wide visual field image is a distorted image using equidistant cylindrical projection, for example, and is an image where a position of each pixel can be corresponded to the coordinates on the surface of the sphere. In S401, the original image of this wide visual field image is mapped on the sphere, and a part of the mapped image is extracted and displayed. In other words, the image displayed in S401 is an image generated by extracting and enlarging a part of the wide visual field image, with removing (or reducing) the distortion of the original image. The display direction of the wide visual field image (direction of displaying the wide visual field image with respect to the display 105), when the electronic device 100 is in the horizontal attitude, may be 90° different from that when the electronic device 100 is in the vertical attitude. The direction of the slide operation (direction of Touch-Move) to be described below is assumed to be the direction with respect to the display direction. For example, the slide operation to the right is a slide operation to the right with respect to the vertical direction of the display target (e.g. wide visual field image, text, icons) on the display.

In S402, based on the information notified from the touch panel 106*a*, the CPU 101 determines whether Touch-Down is performed on a displayed region of the wide visual field image on the touch panel 106*a* (image display region). Processing advances to S404 if Touch-Down is performed or to S403 if not.

In S403, the CPU 101 determines whether the instruction to end the display of the wide visual field image that started in S401 is input. The CPU ends the display of the wide visual field image if the instruction to end the display is input, or processing advances to S402 if not.

In S404, the CPU 101 determines whether a range of the wide visual field image, including a first vertex (zenith) which is a vertex in the positive direction of the first axis, or a second vertex (nadir) which is a vertex in the negative direction of the first axis, is displayed on the image display region of the wide visual field image on the display 105. Processing advances to S413 if the range including the first vertex or the second vertex is displayed, or to S405 if a range, including neither the first vertex nor the second vertex, is displayed. In Example 1, the CPU 101 determines that the range of the wide visual field image, including the first vertex or the second vertex, is displayed when a range, including the zenith 311 or the nadir 312, is displayed on the image display region of the wide visual field image of the display 105.

Case of Not Including Zenith and Nadir in Display Range When Slide Operation to Right is Performed In S405, the CPU 101 determines whether the slide operation to the right (Touch-Move to the right), which is the moving operation on the touch panel 106*a* in the positive direction of the second axis, is performed. Processing advances to S406 if the slide operation to the right is performed, or to S407 if the slide operation to the right is not performed.

In S406, the CPU 101 changes the display range of the wide visual field image to be displayed on the display 105 by rotating the wide visual field image around the yaw axis 302 (vertical axis), that is, around the first axis, in a direction in accordance with the direction of the moving operation in the second axis direction detected in S405. In Example 1, the CPU 101 rotates the wide visual field image clockwise (rotation to the right when viewed from the top), which is the direction in accordance with the direction of the slide operation to the right, around the yaw axis 302, by the rotation amount in accordance with the amount of slide to the right detected in S405. Thereby the displayed image moves to the right, and the image to the further left side is displayed (the display range moves to the left).

"Rotate" herein below refers to rotating the wide visual field image, with fixing the display range (that is, using the display range as a reference) in the conceptual diagrams described in FIGS. 1A to 1D and FIG. 3. In other words, "rotate" refers to a control of changing (moving or scrolling) the display range, assuming that the range of the wide visual field within the display range is changed by rotating the wide visual field image. This processing includes, for example, the display processing to display an image region that was not displayed, and the distortion correction processing (e.g. processing to read a portion corresponding to the display range from the original image drawn by the equidistant cylindrical projection, map the portion so as to cancel out the distortion and then display the portion). "Rotate the range of the wide visual field image" refers to rotating the image within the display range with reference to the line of sight direction (that is, with reference to the display range). If it is interpreted that the line of sight direction rotates with reference to the image, this rotating direction is the opposite of the above-mentioned rotating direction. In other words, in the case of S406, if the slide operation to the right is performed, the image rotates to the right and the display range rotates to the opposite direction, that is, to the left.

The processing in S405 and S406 will be described with reference to FIG. 5A and FIG. 5B.

When Line of Sight is Directed in Horizontal Direction

Figure 5A:
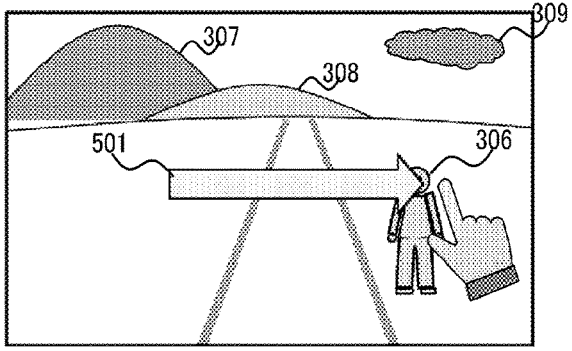
FIGS. 5A to 5H indicate a moving operation of a wide visual field image and display examples before and after the moving operation.
Figure 5B:
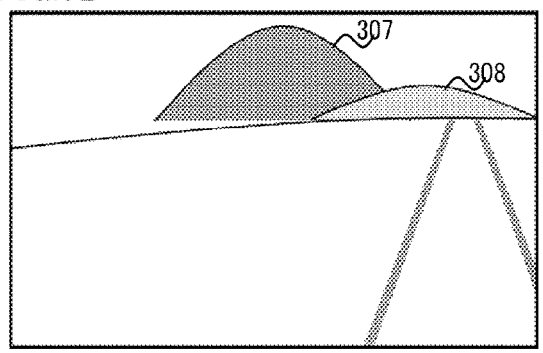

With reference to FIG. 5A and FIG. 5B, a case where the processing in S405 and S406 are performed in the state of displaying the range of the wide visual field image 301 including neither the zenith nor the nadir, when the light of sight is directed in the horizontal direction, will be described. The display with the line of sight being directed in the horizontal direction refers to the display when the line of sight is directed in the depth direction, which is perpendicular to the first axis (vertical direction) and the second axis (horizontal direction) in FIGS. 1A to 1D.

FIG. 5A is a display example of the wide visual field image 301 when the line of sight is directed in the horizontal direction. In FIG. 5A, the slide operation to the right 501 is input, hence it is determined in S405 that the slide operation to the right is performed.

FIG. 5B is a display example when the slide operation to the right, which is the moving operation in the positive direction of the second axis, is performed in the state of the display in FIG. 5A, and the processing in S406 is performed. In other words, FIG. 5B is a display example when the display range of the wide visual field image to be displayed on the display 105 is changed by rotating the wide visual field image clockwise (rightward rotation when viewed from the top) around the yaw axis 302, which is the first axis, in S406. The display range of the wide visual field image is rotated counterclockwise (leftward rotation when viewed from the top) around the yaw axis 302. In FIG. 5B, the image displayed on the display 105 moves from the left to the right, because the wide visual field image is rotated to the right from a top view around the yaw axis 302 when viewed from the top, in the state of FIG. 5A, and the individual 306 located within the display range in FIG. 5A is outside the display range in FIG. 5A, The display range relatively rotates leftward, therefore the range of the wide visual field image that is on the left side of the display range in FIG. 5A is displayed in FIG. 5B, When Slide Operation to Left is Performed In S407, the CPU 101 determines whether the slide operation to the left (Touch-Move to the left), which is the moving operation on the touch panel 106a in the negative direction of the second axis, is performed. Processing advances to S408 if the slide operation to the left is performed, or to S409 if the slide operation to the left is not performed.

On S408, the CPU 101 changes the display range of the wide visual field image to be displayed on the display 105 by rotating the wide visual field image around the yaw axis 302 (vertical axis), that is, around the first axis, in a direction in accordance with the direction of the moving operation in the second axis direction detected in S407. In Example 1, the CPU 101 rotates the wide visual field image counterclockwise (leftward rotations when viewed from the top), which is the direction in accordance with the direction of the slide operation to the left, around the yaw axis 302 by the rotation amount in accordance with the amount of the slide to the left, detected in S407. Thereby the displayed image moves to the left and the image to the further right side is displayed (the display range moves to the right).

The processing in S407 and S408 will be described with reference to FIG. 5C and FIG. 5D.

When Line of Sight is Directed in Horizontal Direction

Figure 5C:
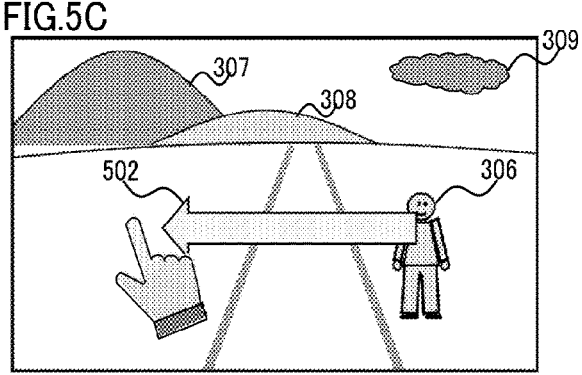
Figure 5D:
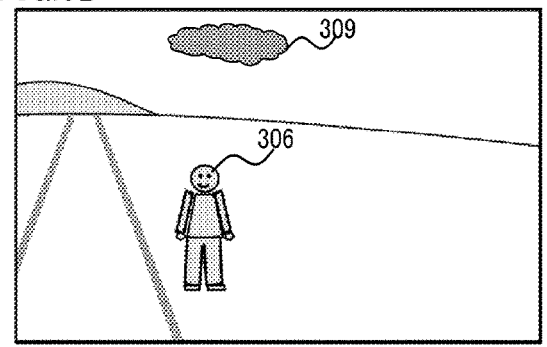

With reference to FIG. 5C and FIG. 5D, a case where the processing in S407 and S408 are performed in the state of displaying the range of the wide visual field image 301, including neither the zenith nor the nadir, when the line of sight is directed in the horizontal direction, will be described.

FIG. 5C is a display example of the wide visual field image 301 when the line of sight is directed in the horizontal direction. In FIG. 5C, the slide operation to the left 502 is input, hence it is determined in S407 that the slide operation to the left is performed.

FIG. 5D is a display example when the slide operation to the left, which is the moving operation in the negative direction of the second axis, is performed in the state of the display in FIG. 5C, and the processing in S408 is performed. In other words, FIG. 5D is a display example when the display range of the wide visual field image to be displayed on the display 105 is changed by rotating the wide visual field image counterclockwise (leftward rotation when viewed from the top) around the yaw axis 302, which is the first axis, in S408. The display range of the wide visual field image is rotated clockwise (leftward rotation when viewed from the top) around the yaw axis 302. In FIG. 5D, the image displayed on the display 105 moves from the right to the left because the wide visual field image is rotated leftward around the yaw axis 302 when viewed from the top in the state of FIG. 5C, and the mountain 307 located within the display range in FIG. 5C is outside the display range in FIG. 5C. The display range relatively rotates to the right, therefore the range of the wide visual field image that is on the right side of the display range in FIG. 5C is displayed in FIG. 5D.

When Upward Slide Operation is Performed

In S409, the CPU 101 determines whether the upward slide operation (upward Touch-Move), which is the moving operation on the touch panel 106a in the positive direction of the first axis, is performed. Processing advances to S410 if the upward slide operation is performed, or to S411 if the upward slide operation is not performed.

In S401, the CPU 101 changes the display range of the wide visual field image to be displayed on the display 105 by rotating the wide visual field image around the pitch axis 303 (horizontal axis), that is, around the second axis, in a direction in accordance with the direction of the moving operation in the first axis direction detected in S409. In Example 1, the CPU 101 rotates the wide visual field image counterclockwise (rotation in the elevation angle direction, leftward rotation when viewed from the right), which is the direction in accordance with the direction of the upward slide operation, around the pitch axis 303 by the rotation amount in accordance with the amount of the upward slide, detected in S409. The display range of the wide visual field image is rotated clockwise (rotation in the depression angle direction, rightward rotation when viewed from the right) around the pitch axis 303. Thereby the displayed image moves upward and the image to the further down side is displayed (the display range moves downward). In other words, when the line of sight is directed in the horizontal direction, the line of sight is moved so as to view downward. If the line of sight is already directed in a direction close to the nadir, the line of sight can no longer be moved downward. Specifically, the moving of the display range in the vertical direction is limited, so that the nadir 312 does not move upward from a predetermined position (e.g. center) in the vertical direction in the display range.

The processing in S409 and S410 will be described with reference to FIG. 5E, FIG. 5F, FIG. 6A and FIG. 6B.

When Line of Sight is Directed in Horizontal Direction

Figure 5E:
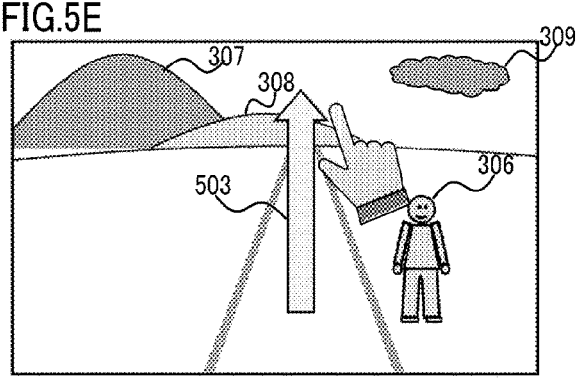
Figure 5F:
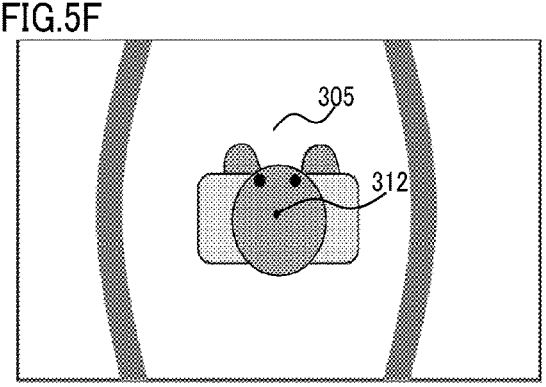

With reference to FIG. 5E and FIG. 5F, a case where the processing in S409 and S410 are performed in the state of displaying the range of the wide visual field image 301, including neither the zenith nor the nadir, when the line of sight is directed in the horizontal direction, will be described.

FIG. 5E is a display example of the wide visual field image 301 when the line of sight is directed in the horizontal direction. In FIG. 5E, the upward slide operation 503 is input, hence it is determined in S409 that the upward slide operation is performed in.

FIG. 5F is a display example when the upward slide operation, which is the moving operation in the positive direction of the first axis, is performed in the state of the display in FIG. 5E, and the processing in S410 is performed. In other words, FIG. 5F is a display example when the display range of the wide visual field image to be displayed on the display 105 is changed by rotating the wide visual field image counterclockwise (rotation in the elevation angle direction, leftward rotation when viewed from the right) around the pitch axis 303, which is the second axis, in S410. The display range of the wide visual field image is rotated clockwise (rotation in the depression angle direction, rightward rotation when viewed from the right) around the pitch axis 303. In FIG. 5F, the image displayed on the display 105 moves upward because the wide visual field image is rotated in the elevation angle direction around the pitch axis 303 in the state of FIG. 5E. The individual 305 and the nadir 312, which are outside the display range in FIG. 5E, are located within the screen (within the display range). The display range relatively rotates downward (rotates in the depression angle direction), therefore the display range of the wide visual field image that is below the display range in FIG. 5E is displayed in FIG. 5F.

When Line of Sight is Directed Downward

Figure 6B:
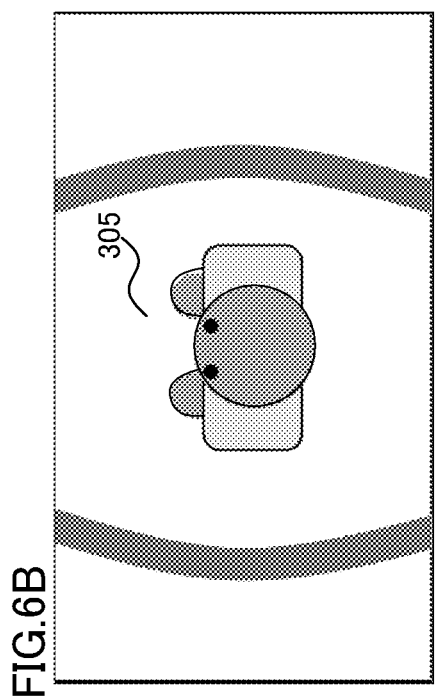
FIGS. 6A to 6D indicate a moving operation of a wide visual field image and display examples before and after the moving operation.
Figure 6D:
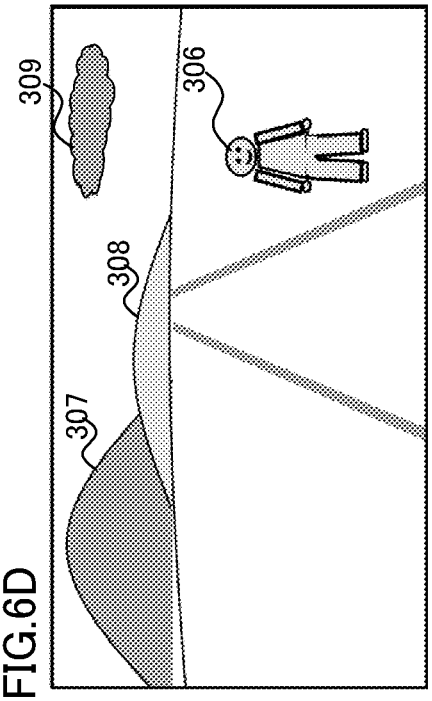
Figure 6A:
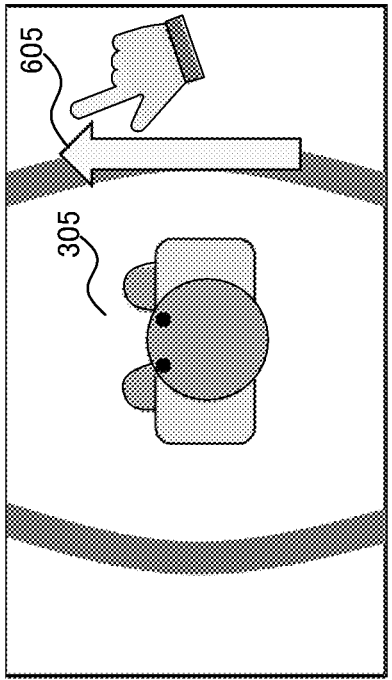

With reference to FIG. 6A and FIG. 6B, a case where the processing in S409 and S410 are performed in the state of displaying the range of the wide visual field image 301, when the line of sight is directed downward, will be described.

FIG. 6A is a display example of the wide visual field image 301 when the line of sight is directed downward. In FIG. 6A, the upward slide operation 605 is input, hence it is determined om S409 that the upward slide operation is performed.

FIG. 6B is a display example when the upward slide operation, which is the moving operation in the positive direction of the first axis, is performed in the state of the display in FIG. 6A, and the processing in S410 is performed. In other words, FIG. 6B is a display example when the display range of the wide visual field image displayed on the display 105 is changed by rotating the wide visual field image counterclockwise (rotation in the elevation angle direction) around the pitch axis 303, which is the second axis in S410. The display range of the wide visual field image is rotated clockwise (rotation in the depression angle direction, rightward rotation when viewed from the right) around the pitch axis 303. In the case of the state where the line of sight is directed to the area near the nadir, as in the case of FIG. 6A, (in the case where the nadir 312 moves to a predetermined position (e.g. center) in the vertical direction of the display range), the wide visual field image no longer rotates in the elevation angle direction (the display range no longer rotates in the depression angle direction). In other words, the display range does not change very much between FIG. 6A and FIG. 6B. In FIG. 6A, the nadir 312 is included in the display range. However, if the upward slide operation is performed (there is no horizontal slide components), the display range is changed in the same direction (direction to rotate the wide visual field image in the elevation angle direction around the pitch axis 303, which is the second axis), regardless of the position of the start point of the slide operation.

When Downward Slide Operation is Performed

In S411, the CPU 101 determines whether the downward slide operation (downward Touch-Move), which is the moving operation on the touch panel 106a in the negative direction of the first axis, is performed. Processing advances to S412 if the downward slide operation is performed, or to S403 if the downward slide operation is not performed.

In S412, the CPU 101 changes the display range of the wide visual field image to be displayed on the display 105 by rotating the wide visual field image around the pitch axis 303 (horizontal axis), that is, around the second axis, in a direction in accordance with the direction of the moving operation in the first axis direction detected in S411. In Example 1, the CPU 101 rotates the wide visual field image clockwise (rotation in the depression angle direction, rightward rotation when viewed from the right), which is the direction in accordance with the direction of the downward slide operation, around the pitch axis 303 by the rotation amount in accordance with the amount of downward slide, detected in S411. The display range of the wide visual field image is rotated counterclockwise (rotation in the elevation angle direction, leftward rotation when viewed from the right) around the pitch axis 303. Thereby the displayed image moves downward, and the image to the further upside is displayed (the display range moves upward). In other words, when the light of sight is directed in the horizontal direction, the line of sight is moved so as to view upward. If the line of sight is already directed in a direction close to the zenith, the line of sight can no longer be moved upward. Specifically, the moving of the display range in the vertical direction is limited, so that the zenith 311 does not move downward from a predetermined position (e.g. center) in the vertical direction in the display range.

The processing in S411 and S412 will be described with reference to FIG. 5G, FIG. 5H, FIG. 6C and FIG. 6D.

When Line of Sight is Directed in Horizontal Direction

Figure 5G:
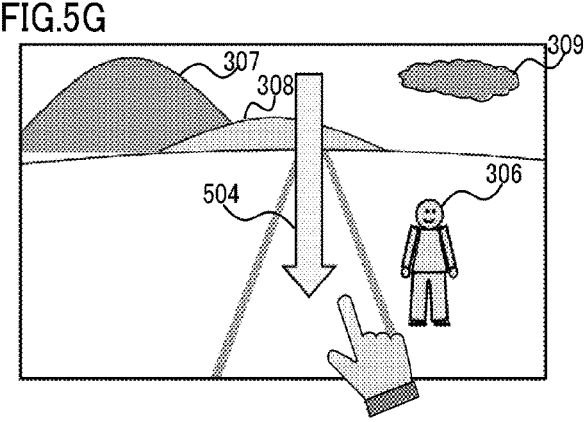
Figure 5H:
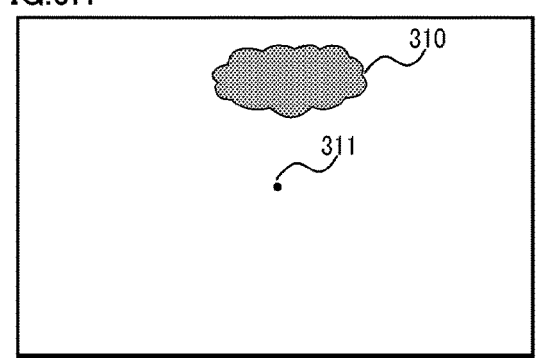

With reference to FIG. 5G and FIG. 5H, a case where the processing in S411 and S412 are performed in the state of displaying the range of the wide visual field image 301, including neither the zenith 311 nor the nadir 312, when the line of sight is directed in the horizontal direction, will be described.

FIG. 5G is a display example of the wide visual field image 301 when the line of sight is directed in the horizontal direction. In FIG. 5G, the downward slide operation 504 is input, hence it is determined in S411 that the downward slide operation is performed.

FIG. 5H is a display example when the downward slide operation, which is the moving operation in the negative direction of the first axis, is performed in the state to display in FIG. 5G, and the processing in S412 is performed. In other words, FIG. 5H is a display example when the display range of the wide visual field image to be displayed on the display 105 is changed by rotating the wide visual field image clockwise (rotation in the depression angle direction, rightward rotation when viewed from the right) around the pitch axis 303, which is the second axis, in S412, The display range of the wide visual field image is rotated counterclockwise (rotation in the elevation angle direction, leftward rotation when viewed from the right) around the pitch axis 303. In FIG. 5H, the image displayed on the display 105 moves upward, because the wide visual field image is rotated in the depression angle direction around the pitch axis 303 in the state of FIG. 5G. The cloud 310 and the zenith 311, which are outside the display range in FIG. 5G, are located within the screen range. The display range relatively rotates upward (rotates in the elevation angle direction), therefore the display range of the wide visual field image that is above the display range in FIG. 5G is displayed in FIG. 5H.

When Line of Sight is Directed Downward

Figure 6C:
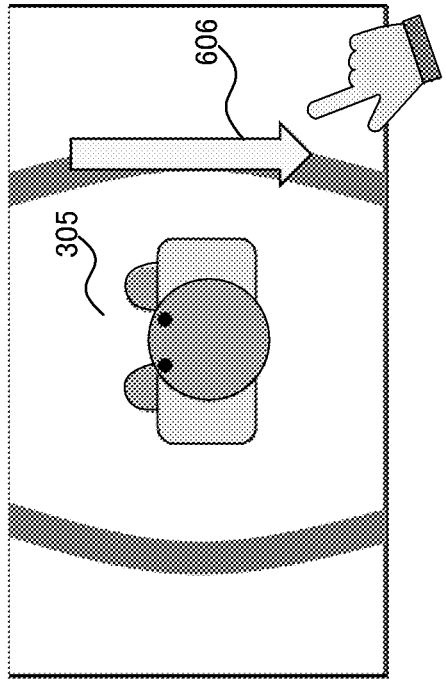

With reference to FIG. 6C and FIG. 6D, a case where the processing in S411 and S412 are performed in the state of displaying the range of the wide visual field image 301, when the line of sight is directed downward, will be described.

FIG. 6C is a display example of the wide visual field image 301 when the line of sight is directed downward. In FIG. 6C, the downward slide operation 606 is input, hence it is determined in S411 that the downward slide operation is performed.

FIG. 6D is a display example when the downward slide operation, which is the moving operation in the negative direction of the first axis, is performed in the state of the display in FIG. 6C, and the processing in S412 is performed. In other words, FIG. 6D is a display example when the display range of the wide visual field image, displayed on the display 105, is changed by rotating the wide visual field image clockwise (rotation in the depression angle direction, rightward rotation when viewed from the right around the pitch axis 303, which is the second axis in S412. The display range of the wide visual field image is rotated counterclockwise (rotation in the elevation angle direction, leftward rotation when viewed from the right) around the pitch axis 303. In FIG. 6D, the wide visual field image rotates in the depression angle direction around the pitch axis 303 in the state of FIG. 6C, hence the individual 306, which is outside the display range in FIG. 6C, is located within the screen. The individual 305, on the other hand, is outside the display range. The display range relatively rotates upward (rotates in the depression angle direction), therefore the display range of the wide visual field image, that is above the display range in FIG. 6C, is displayed in FIG. 6D. In FIG. 6C, the nadir 312 is included in the display range. However, if the downward slide operation is performed (there are no horizontal slide components), the display range is changed in the same direction, regardless of the position of the start point of the slide operation. In other words, the display range is changed by rotating the wide visual field image in the depression angle direction, and rotating the display range in the elevation angle direction around the pitch axis 303, which is the second axis.

Case of including Zenith or Nadir in Display Range

In S413, the CPU 101 determines whether the range of the wide visual field image, including the second vertex (nadir) which is the vertex in the negative direction of the first axis, is displayed on the image display region of the wide visual field image of the display 105. Processing advances to S414 if the nadir 312 is included in the display range, or to S415 if the nadir 312 is not included in the display range. In other words, processing advances to S415 if a range of the wide visual field image, including the first vertex (zenith 311) which is the vertex in the positive direction of the first axis, is displayed on the display 105.

When Display Range Includes Nadir

In S414, the CPU 101 determines whether the moving operation (slide operation) in the second axis direction (horizontal direction) is input, starting from a negative side position of the second vertex (nadir 312) in the first axis direction (vertical direction) in the wide visual field image. In Example 1, the CPU 101 determines whether the Touch-Down position to the display 105 detected in S402 is located below the nadir 312. Processing advances to S416 if the Touch-Down position is below the nadir 312, or to S405 if the Touch-Down position is not below the nadir 312.

Slide to Right

S414 will be described with reference to FIG. 7A and FIG. 7E.

When Position Above Nadir is Slid to Right

Figure 7A:
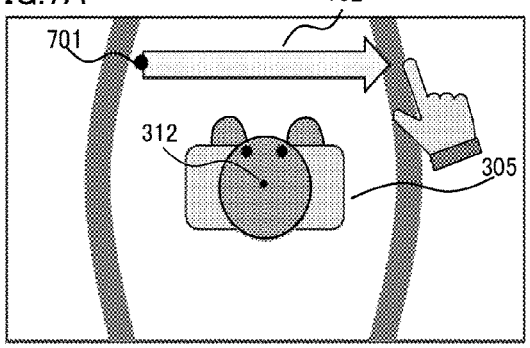
FIGS. 7A to 7H indicate a moving operation of a wide visual field image and display examples before and after the moving operation.

In FIG. 7A, the range of the wide visual field image, including the second vertex (nadir), which is the vertex in the negative direction of the first axis, is displayed on the display 105. FIG. 7A indicates a state where the slide operation to the right (Touch-Move to the right) 702, which is the moving operation in the positive direction of the second axis, is input in this state. The Touch-Down position 701, which is the start point of this slide operation to the right 702, is at a positive side portion (upward in the vertical direction) of the second vertex (nadir 312) in the first axis direction. Therefore, in S414, the CPU 101 determines that the Touch-Down position is not below the nadir 312 (No in S414).

When Position Below Nadir is Slid to Right

Figure 7B:
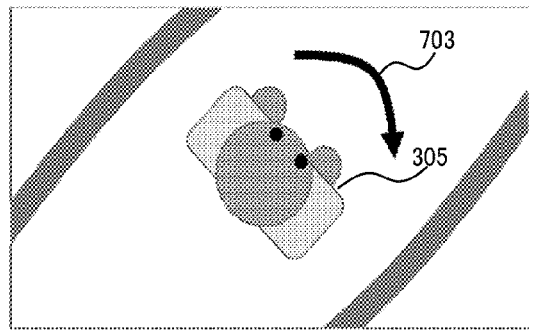
Figure 7C:
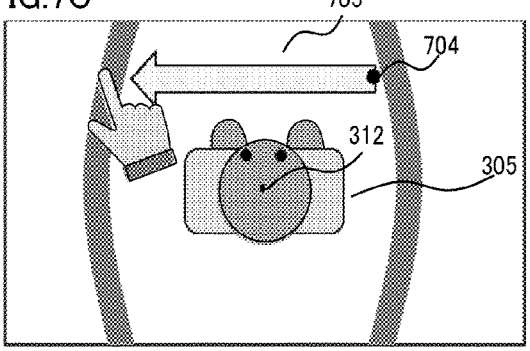
Figure 7D:
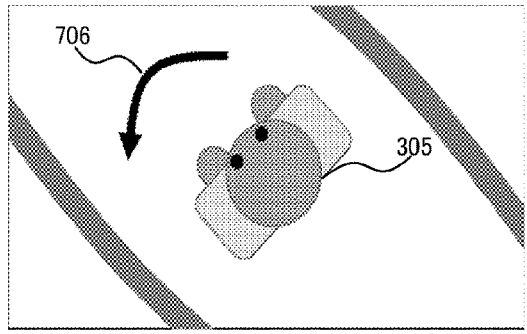
Figure 7E:
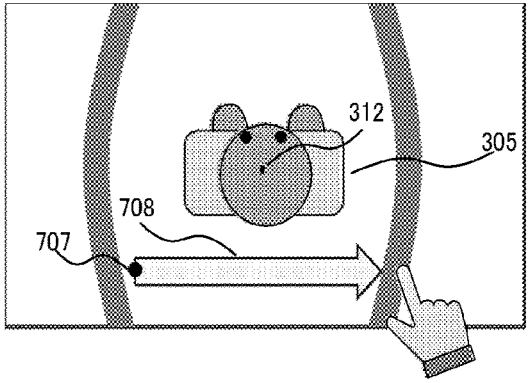

In FIG. 7E, the range of the wide visual field image, including the second vertex (nadir), which is the vertex in the negative direction of the first axis, is displayed on the display 105. FIG. 7E indicates a state where the slide operation to the right (Touch-Move to the right) 708, which is the moving operation in the positive direction of the second axis, is input in this state. The Touch-Down position 707, which is the start point of this slide operation to the right 708, is at a negative side (downward in the vertical direction) of the second vertex (nadir 312) in the first axis direction. Therefore, in S414, the CPU 101 determines that the Touch-Down position is below the nadir 312 (Yes in S414).

When Display Range Includes Zenith

In S415, the CPU 101 determines whether the moving operation (slide operation) in the second axis direction (horizontal direction) is input, starting from a positive side position of the first vertex (zenith 311) in the first axis direction (vertical direction) in the wide visual field image. In Example 1, the CPU 101 determines whether the Touch-Down position to the display 105 detected in S402 is located above the zenith 311. Processing advances to S416 if the Touch-Down position is above the zenith 311, or to S405 if the Touch-Down position is not above the zenith 311.

Slide to Right

S415 will be described with reference to FIG. 8A and FIG. 8E.

When Position Above Zenith is Slid to Right

Figure 8A:
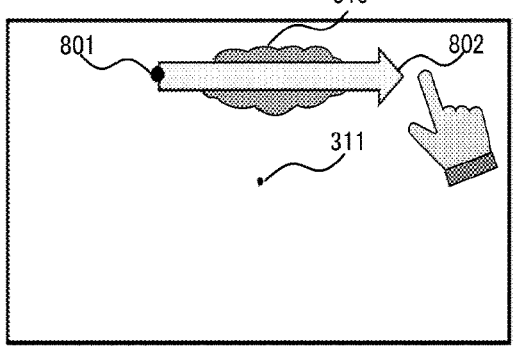
FIGS. 8A to 8H indicate a moving operation of a wide visual field image and display examples before and after the moving operation.

In FIG. 8A, the range of the wide visual field image, including the first vertex (zenith), which is the vertex in the positive direction of the first axis, is displayed on the display 105. FIG. 8A indicates a state where the slide operation to the right (Touch-Move to the right) 802, which is the moving operation in the positive direction of the second axis, is input in this state. The Touch-Down position 801, which is the start point of this slide operation to the right 802, is at a positive side (upward in the vertical direction) of the first vertex (zenith 311) in the first axis direction. Therefore, in S415, the CPU 101 determines that the Touch-Down position is above the zenith 311 (Yes in S415), When Position Below Zenith is Slid to Right In FIG. 8E, a range of the wide visual field image, including the first vertex (zenith), which is the vertex in the positive direction of the first axis, is displayed on the display 105. FIG. 8E indicates a state where the slide operation to the right (Touch-Move to the right) 808, which is the moving operation in the positive direction of the second axis, is input in this state. The Touch-Down position 807, which is the start point of this slide operation to the right 808, is at a negative side (downward in the vertical direction) of the first vertex (zenith 311) in the first axis direction. Therefore, in S415, the CPU 101 determines that the Touch-Down position is not above the zenith 311 (No in S415).

In S416, the CPU 101 determines whether the slide operation to the right (Touch-Move to the right), which is the moving operation in the positive direction of the second axis, is performed on the touch panel 106a. Processing advances to S417 if the slide operation to the right is performed, or to S418 if the slide operation to the right is not performed.

In S417, the CPU 101 changes the display range of the wide visual field image to be displayed on the display 105 by rotating the wide visual field image counterclockwise around the yaw axis 302 (vertical axis), that is, around the first axis. In Example 1, the CPU 101 rotates the wide visual field image counterclockwise (leftward rotation when viewed from the top) around the yaw axis 302 by the rotation amount in accordance with the amount of the slide to the right detected in S416.

When Display Range Includes Nadir and Position Below Nadir is Slid to Right

Figure 7F:
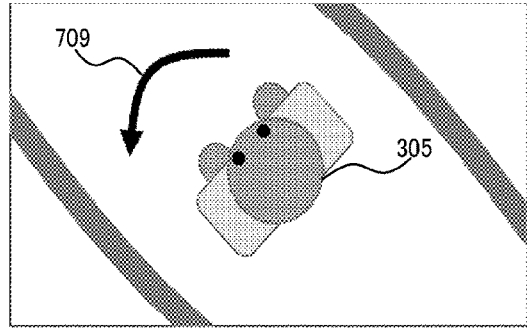

With reference to FIG. 7E and FIG. 7F, a case where it is determined in S414 that the Touch-Down position is below the nadir 312, and S416 and S417 are executed, will be described.

In FIG. 7E, a range of the wide visual field image 301, including the second vertex (nadir 312), which is the vertex in the negative direction of the first axis, is displayed in the image display region of the wide visual field image on the display 105. FIG. 7F indicates a state where the moving operation in the positive direction of the second axis (slide operation to the right 708), is performed, starting from the Touch-Down position 707 located in a negative side (downward in the vertical direction) of the second vertex (nadir 312) in the first axis direction in the state of FIG. 7C. FIG. 7F is a display example when the display of the wide visual field image on the display 105 is changed in S417 by rotating the wide visual field image 301 counterclockwise (leftward rotation 709 when viewed from the top) around the yaw axis 302, which is the first axis. When the wide visual field image is displayed on the display 105, the image rotates counterclockwise in the entire display region, and particularly in a position where the slide operation 708 is performed, the image moves to the right, which is the same as the direction of the slide operation 708. As mentioned above, conventionally the image rotates clockwise in the entire display region, hence the image moves to the left at the position of the slide operation to the right 708, which may cause a sense of irritation to the user, but in Example 1, the sense of irritation that the user experiences can be prevented.

When Display Range Includes Nadir and Position Above Nadir is Slid to Right

With reference to FIG. 7A and FIG. 7B, the slide operation to the right, in a case where it is determined in S414 that the Touch-Down position is not below the nadir 312, will be described.

In FIG. 7A, a range of the wide visual field image 301, including the second vertex (nadir 312), which is the vertex in the negative direction of the first axis, is displayed in the image display region of the wide visual field image on the display 105. FIG. 7B indicates a state where the moving operation in the positive direction of the second axis (slide operation to the right 702) is performed, starting from the Touch-Down position 701 located in a positive side (upward in the vertical direction) of the second vertex (nadir 312) in the first axis direction in the state of FIG. 7A. FIG. 7B is a display example when the display of the wide visual field image on the display 105 is changed in S406 by rotating the wide visual field image 301 clockwise (rightward rotation 703 when viewed from the top) around the yaw axis 302, which is the first axis. When the wide visual field image is displayed on the display 105, the image rotates clockwise in the entire display region, and particularly in a position where the slide operation 702 is performed, the image moves to the right, which is the same as the direction of the slide operation 702, therefore the sense of irritation that the user experiences can be prevented.

When Display Range Includes Zenith and Position Above Zenith is Slid to Right

Figure 8B:
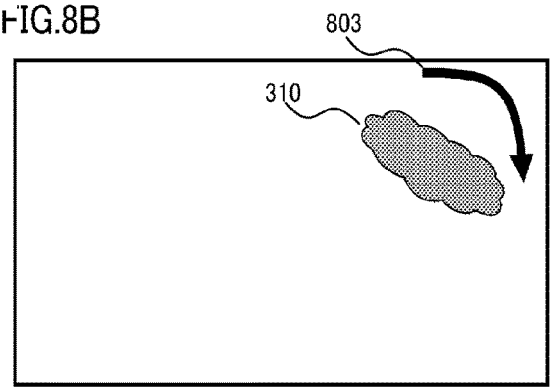

With reference to FIG. 5A and FIG. 8B, a case where it is determined in S415 that the Touch-Down position is above the zenith 311, and S416 and S417 are executed, will be described.

In FIG. 8A, a range of the wide visual field image 301, including the first vertex (zenith 311), which is the vertex in the positive direction of the first axis, is displayed in the image display region of the wide visual field image on the display 105. FIG. 8B indicates a state where the moving operation in the positive direction of the second axis (slide operation to the right 802), is performed, starting from the Touch-Down position 801 located in a positive side (upward in the vertical direction) of the first vertex (zenith 311) in the first axis direction in the state of FIG. 5A. FIG. 8B is a display example when the display of the wide visual field image on the display 105 is changed in S417 by rotating the wide visual field image 301 counterclockwise (leftward rotation 803 when viewed from the top) around the yaw axis 302, which is the first axis. When the wide visual field image is displayed on the display 105, the image rotates clockwise in the entire display region, since FIG. 8B is a view when the zenith 311 is viewed from the bottom (center side of the virtual sphere). Particularly in a position where the slide operation 802 is performed, the image moves to the right, which is the same as the direction of the slide operation 802. As mentioned above, conventionally the wide visual field image rotates clockwise when viewed from the top, hence the image rotates counterclockwise in the entire display region when the zenith 311 is viewed from the bottom. Therefore, the image moves to the left at the position of the slide operation to the right 802, which may cause a sense of irritation to the user, but in Example 1, the sense of irritation that the user experiences can be prevented.

When Display Range Includes Zenith and Position Below Zenith is Slid to Right

Figure 8C:
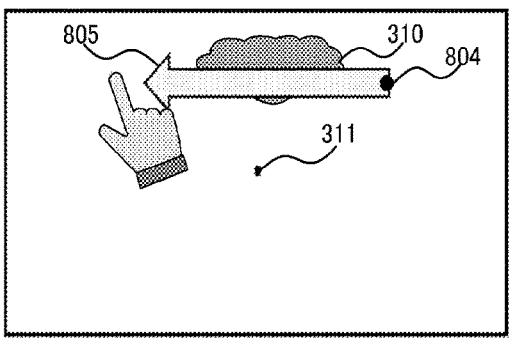
Figure 8D:
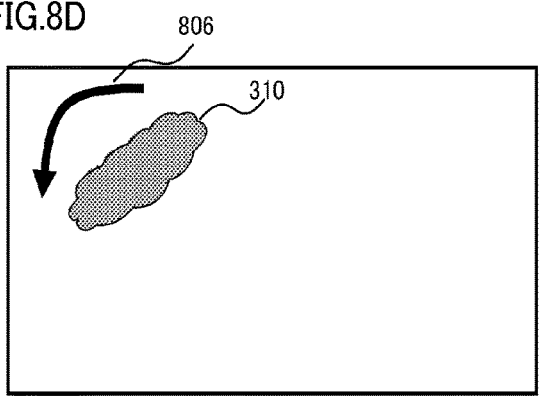
Figure 8E:
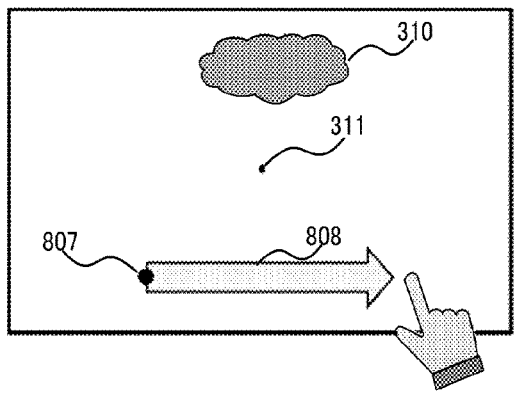
Figure 8F:
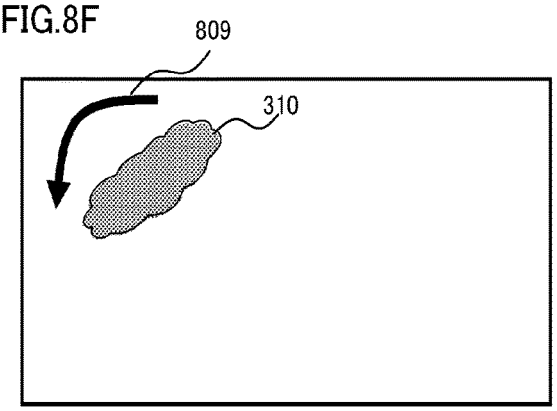

With reference to FIG. 8E and FIG. 8F, the slide operation to the tight, in a case where it is determined in S415 that the Touch-Down position is not above the zenith 311, will be described.

In FIG. 8E, a range of the wide visual field image 301, including the first vertex (zenith 311), which is the vertex in the positive direction of the first axis, is displayed in the image display region of the wide visual field image on the display 105. FIG. 8F indicates a state where the moving operation in the positive direction of the second axis (slide operation to the right 808) is performed, starting from the Touch-Down position 807 located in a negative side (downward in the vertical direction) of the first vertex (zenith 311) in the first axis direction in the state of FIG. 8E. FIG. 8F is a display example when the display of the wide visual field image on the display 105 is changed in S406 by rotating the wide visual field image 301 clockwise (rightward rotation 809 when viewed from the top) around the yaw axis 302, which is the first axis. When the wide visual field image is displayed on the display 105, the image rotates counterclockwise in the entire display region, since FIG. 8F is a view when the zenith 311 is viewed from the bottom (center side of the virtual sphere). Particularly in a position where the slide operation 808 is performed, the image moves to the right, which is the same as the direction of the slide operation 808, therefore a sense of irritation that the user experiences can be prevented.

In FIG. 418, the CPU 101 determines whether the slide operation to the left (Touch-Move to the left), which is the moving operation in the negative direction of the second axis, is performed on the touch panel 106a. Processing advances to S419 if the slide operation to the left is performed, or to S420 if the slide operation to the left is not performed.

In S419, the CPU 101 changes the display range of the wide visual field image to be displayed on the display 105 by rotating the wide visual field image clockwise around the yaw axis 302 (vertical axis), that is, around the first axis. In Example 1, the CPU 101 rotates the wide visual field image clockwise (rightward rotation when viewed from the top) around the yaw axis 302 by the rotation amount in accordance with the amount of the slide to the left detected in S418.

When Display Range Includes Nadir and Position Below Nadir is Slid to Left

Figure 7G:
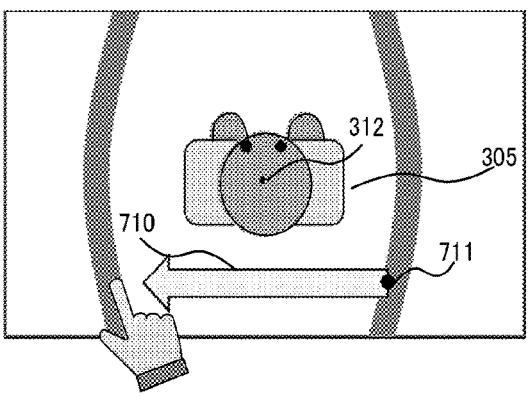
Figure 7H:
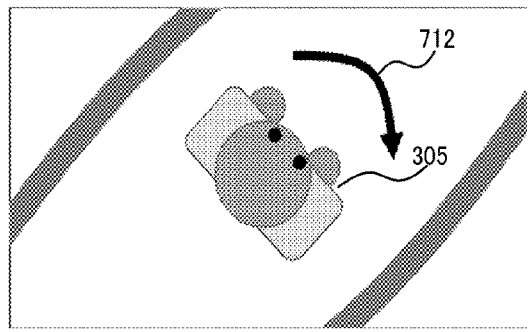

With reference to FIG. 7G and FIG. 7H, a case where it is determined in S414 that the Touch-Down position is below the nadir 312, and S418 and S419 are executed, will be described.

In FIG. 7G, a range of the wide visual field image 301, including the second vertex (nadir 312), which is the vertex in the negative direction of the first axis, is displayed on the display 105, FIG. 7H indicates a state where the moving operation in the negative direction of the second axis (slide operation to the left 710) is performed, starting from the Touch-Down position 711 located in a negative side (downward in the vertical direction) of the second vertex (nadir 312) in the first axis direction in the state of FIG. 7G. FIG. 7H is a display example when the display of the wide visual field image on the display 105 is changed in S419 by rotating the wide visual field image 301 clockwise (rightward rotation 712 when viewed from the top) around the yaw axis 302, which is the first axis. When the wide visual field image is displayed on the display 105, the image rotates clockwise in the entire display region, and particularly in a position where the slide operation 710 is performed, the image moves to the left, which is the same as the direction of the slide operation 710. As mentioned above, conventionally the image rotates counterclockwise in the entire display region, hence the image moves to the right at the position of the slide operation to the left 710, which may irritate the user, but in Example 1, the sense of irritation that the user experiences can be prevented.

When Display Range Includes Nadir and Position Above Nadir is Slid to Left

With reference to FIG. 7C and FIG. 7D, the slide operation to the left, in a case where it is determined in S414 that the Touch-Down position is not below the nadir 312, will be described.

In FIG. 7C, a range of the wide visual field image 301 including the second vertex (nadir 312), which is the vertex in the negative direction of the first axis, is displayed on the display 105. FIG. 7D indicates a state where the moving operation in the negative direction of the second axis (slide operation to the left 705) is performed, starting from the Touch-Down position 704 located in a positive side (upward in the vertical direction) of the second vertex (nadir 312) in the first axis direction in the state of FIG. 7C. FIG. 7D is a display example when the display of the wide visual field image on the display 105 is changed in S408 by rotating the wide visual field image 301 counterclockwise (leftward rotation 706 when viewed from the top) around the yaw axis 302, which is the first axis. When the wide visual field image is displayed on the display 105, the image rotates counterclockwise in the entire display region, and particularly in a position where the slide operation 705 is performed, the image moves to the left, which is the same as the direction of the slide operation 705, therefore the sense of irritation that the user experiences can be prevented.

When Display Range Includes Zenith and with Reference to FIG. 8C and FIG. 8D

With reference to FIG. 8C and FIG. 8D, a case where it is determined in S415 that the Touch-Down position is above the zenith 311, and S418 and S419 are executed, will be described.

In FIG. 8C, a range of the wide visual field image 301, including the first vertex (zenith 311), which is the vertex in the positive direction of the first axis, is displayed on the display 105. FIG. 8D indicates a state, where the moving operation in the negative direction of the second axis (slide operation to the left 805), is performed starting from the Touch-Down position 804 located in a positive side (upward in the vertical direction) of the first vertex (zenith 311) in the first axis direction in the state of FIG. 8C. FIG. 8D is a display example when the display of the wide visual field image on the display 105 is changed in S419 by rotating the wide visual field image 301 clockwise (rightward rotation 806 when viewed from the top) around the yaw axis 302, which is the first axis. When the wide visual field image is displayed on the display 105, the image rotates counterclockwise in the entire display region, since FIG. 8D is a view when the zenith 311 is viewed from the bottom (center side of the virtual sphere). Particularly in a position where the slide operation 805 is performed, the image moves to the left, which is the same as the direction of the slide operation 805. As mentioned above, conventionally the wide visual field image rotates counterclockwise when viewed from the top, hence the image rotates clockwise in the entire display region when the zenith 311 is viewed from the bottom. Therefore, the image moves to the right at the position of the slide operation to the left 805, which may cause a sense of irritation to the user, but in Example 1, the sense of irritation experienced by the user can be prevented.

When Display Range Includes Zenith and Position Below Zenith is Slid to Right

Figure 8G:
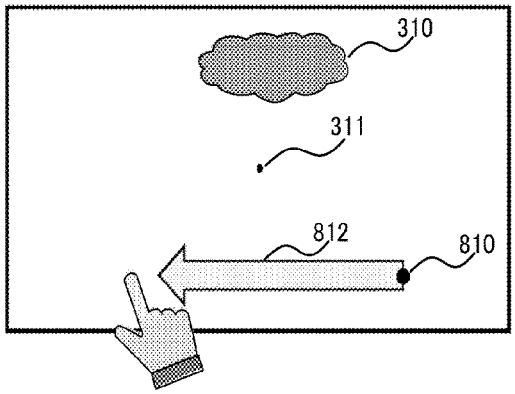
Figure 8H:
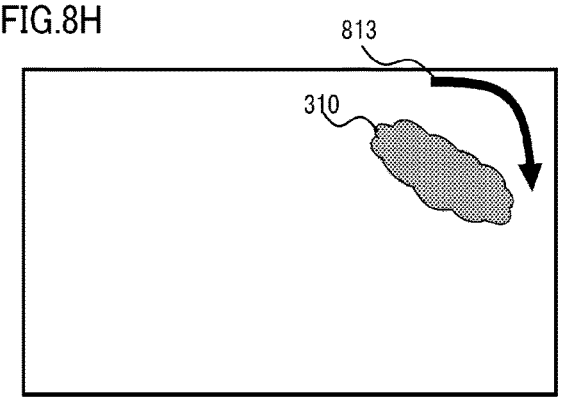

With reference to FIG. 8G and FIG. 8H, the slide operation to the left, in a case where it is determined in S415 that the Touch-Down position is not above the zenith 311, will be described.

In FIG. 8G, a range of the wide visual field image 301, including the first vertex (zenith 311), which is the vertex in the positive direction of the first axis, is displayed on the display 105, FIG. 8H indicates a state where the moving operation in the negative direction of the second axis (slide operation to the left 812) is performed, starting from the Touch-Down position 810 located in a negative side (downward in the vertical direction) of the first vertex (zenith 311) in the first axis direction in the state of FIG. 8G. FIG. 8H is a display example when the display of the wide visual field image on the display 105 is changed in S408 by rotating the wide visual field image 301 counterclockwise (leftward rotation 813 when viewed from the top) around the yaw axis 302, which is the first axis. When the wide visual field image is displayed on the display 105, the image rotates clockwise in the entire display region, since FIG. 8H is a view when the zenith 311 is viewed from the bottom (center side of the virtual sphere). Particularly in a position where the slide operation 812 is performed, the image moves to the left, which is the same as the direction of the slide operation 812, therefore as sense of irritation that the user experiences can be prevented.

The processing in S420 and S421, which are the same as S409 and S411, are omitted.

According to the display control of the wide visual field image, which is performed by the electronic device 100 of Example 1, input of the slide operation (Touch-Move) on the touch panel 106a in the horizontal direction is received in a state where the range, including the zenith 311 or the nadir 312, is displayed on the display 105. Then, depending on the positional relationship between the start point of the input slide operation and the zenith 311 or the nadir 312, the direction of rotating the virtual sphere, on which the wide visual field image is mapped, around the yaw axis 302, is changed. Thereby the direction of changing the display range of the wide visual field image displayed on the display 105 is changed. In concrete terms, the direction of rotating the virtual sphere, on which the wide visual field image is mapped, around the yaw axis 302, are the opposite from each other between the case where the slide operation is performed from a start point located above the zenith 311, and a case where the slide operation is performed from a start point located below the zenith 311. Thereby the directions of changing the display range of the wide visual field image to be displayed on the display 105 become the opposite from each other between the above two cases. Further, the directions of rotating the virtual sphere, on which the wide visual field image is mapped, around the yaw axis 302, are the opposite from each other between the case where the sliding operation is performed from a start point located above the nadir 312, and a case where the sliding operation is performed from a start point located below the nadir 312. Thereby the directions of changing the display range of the wide visual field image to be displayed on the display 105 become the opposite from each other between the above two cases. By performing this display control, if the slide operation is performed in a state where the display range includes the zenith 311 or the nadir 312, the slide operation direction and the moving direction of the image on the display 105 establish a predetermined relationship, regardless of the location of the start point of the slide operation. In Example 1, the slide operation direction and the moving direction of the image on the display 105 match. Hence regardless of which position of the region on the touch panel 106a, on which the wide visual field image is displayed (image display region), is touched to start the slide operation, the movement of the wide visual field image always follows the movement of the pen tip or fingertip, hence the sense of irritation that the user experiences can be prevented.

It is also possible to maintain a relationship in which the slide operation direction and the moving direction of the image on the display 105 are the opposite. For example, in the case of the slide operation to the right 702 in FIG. 7A, the display image rotates counterclockwise (rotates leftward) in FIG. 7B, and in the case of the slide operation to the right in FIG. 7E, the display image rotates clockwise (rotates rightward) in FIG. 7F. In this case as well, regardless of which position on the touch panel 106a is touched to start the slide operation, the wide visual field image always moves in the opposite direction of the movement of the pen tip or the fingertip, hence the sense of irritation that the user experiences can be prevented.

Example 2

The operation of the electronic device 100 according to Example 2 of the present invention will be described with reference to FIG. 9 and FIGS. 10A to 10H. The characteristic of Example 2 is the display control when the moving operation in the horizontal direction (second axis direction) is input to the touch panel 106a in the state where the range of the wide visual field image 301, including a vertex in the first axis direction, the zenith 311 or the nadir 312, that is, is displayed on the display 105. The CPU 101 changes the direction of rotating the wide visual field image 301 around the first axis, in accordance with the positional relationship between the start point (Touch-Down position) of the slide operation, which is the moving operation in the horizontal direction, and the vertex (the zenith 311 or the nadir 312). In concrete terms, when the display range includes the zenith 311, the CPU 101 determines whether the start point of the slide operation is above the zenith 311 by at least a predetermined distance, or is above the zenith 311 by a distance that is less than the predetermined distance, or below the zenith 311, so as to determine the rotating direction of the wide visual field image. When the display range includes the nadir 312, the CPU 101 determines whether the start point of the slide operation is below the nadir 312 by at least a predetermined distance, or is below the nadir 312 by a distance that is less than the predetermined distance, or is above the nadir 312 so as to determine the rotating direction of the wide visual field image.

Figure 9:
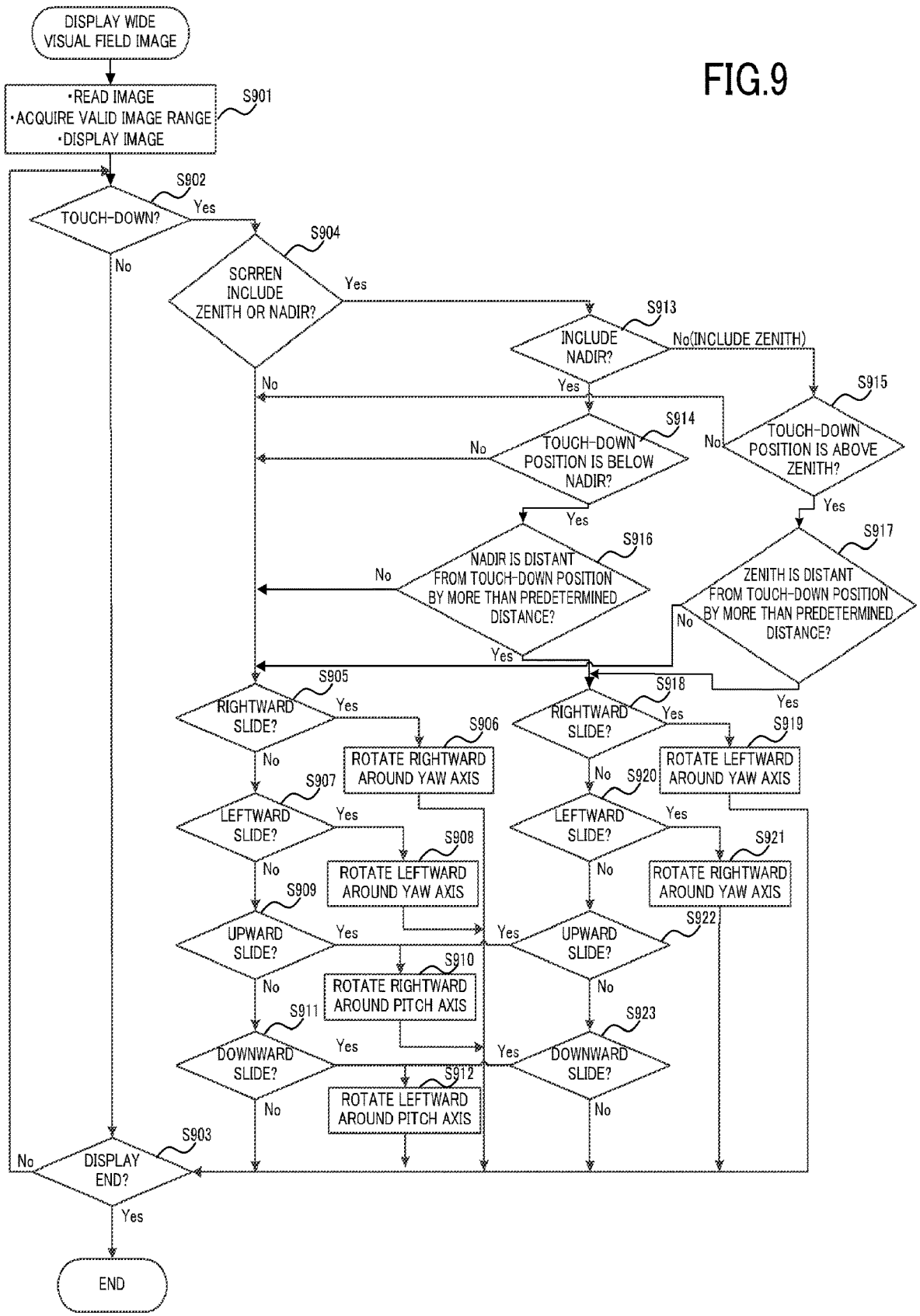
FIG. 9 is a flow chart depicting a wide visual field image display processing according to Example 2.

FIG. 9 is a flow chart depicting the processing flow of the display control of the wide visual field image performed by the electronic device 100 of Example 2. The processing of this flow chart is implemented by developing a program recorded in a non-volatile memory 103 into a memory 102 and the CPU 101 executing this program. When the power of the electronic device 100 is turned ON, and an instruction, to acquire wide visual field image data from a recording medium (storage medium) 108 or an external network 111 and display the acquired wide visual field image data on the display 105, is input, the processing in the flow chart in FIG. 9 starts, Description on S901 to S915 and S918 to S923 in FIG. 9, which are the same as S401 to S421 in FIG. 4 described in Example 1, is omitted.

In S916, the CPU 101 determines whether the distance between the Touch-Down position determined in S914 and the nadir 312 is at least a predetermined distance. Processing advances to S918 if the distance between the Touch-Down position and the nadir 312 determined in S914 is at least the predetermined distance, or to S905 if this distance is less than the predetermined distance.

In S917, the CPU 101 determines whether the distance between the Touch-Down position and the zenith 311 determined in S915 is at least the predetermined distance. Processing advances to S918 if the distance between the Touch-Down position and the zenith 311 determined in S915 is at least the predetermined distance, or to S905 if this distance is less than the predetermined distance.

The processing in S916 will be described with reference to FIG. 10A, FIG. 10B, FIG. 10C and FIG. 10D, and the processing in S917 will be described with reference to FIG. 10E, FIG. 10F, FIG. 10G and FIG. 10H.

Figure 10A:
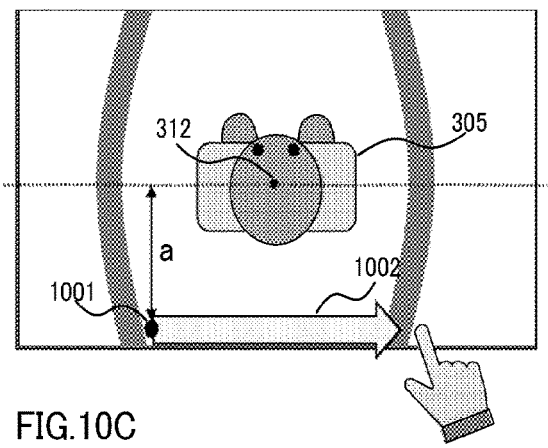
FIGS. 10A to 10H indicate a moving operation of a wide visual field image and display examples before and after the moving operation according to Example 2.
Figure 10B:
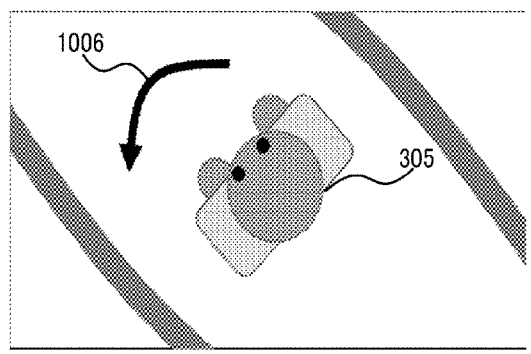

FIG. 10A indicates a state where a range of the wide visual field image 301 including the second vertex (nadir 312), which is a vertex in the negative direction of the first axis, is displayed in the image display region of the wide visual field image on the display 105. In this state, the moving operation in the positive direction of the second axis (slide operation to the right 1002), starting from a Touch-Down position 1001 located at a negative side position (downward in the vertical direction) of the second vertex (nadir 312) in the first axis direction, by a distance a that is at least a predetermined distance. FIG. 10B is a display example when the processing in S919 is performed via S918, and the display of the wide visual field image on the display 105 is changed by rotating the wide visual field image 301 counterclockwise (leftward rotation 1006 when viewed from the top) around the yaw axis 302, which is the first axis. When the wide visual field image is displayed on the display 105, the image rotates counterclockwise in the entire display region, and particularly in a position where the slide operation 1002 is performed, the image moves to the right, which is the same as the direction of the slide operation 1002. As mentioned above, conventionally the image rotates clockwise in the entire display region, hence the image moves to the left at the position of the slide operation to the right 1002, which may cause a sense of irritation to the user, but in Example 2, the sense of irritation that the user experiences can be prevented.

Figure 10C:
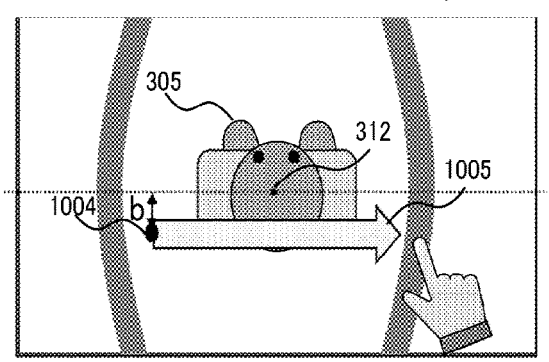
Figure 10D:
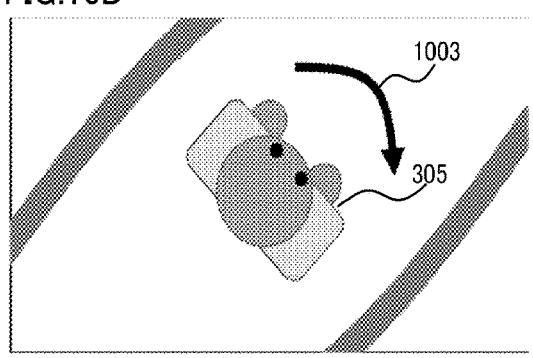

FIG. 10C indicates a state where a range of the wide visual field image 301 including the second vertex (nadir 312), which is a vertex in the negative direction of the first axis, is displayed in the image display region of the wide visual field image on the display 105. In this state, the moving operation in the positive direction of the second axis (slide operation to the right 1005), is performed, starting from the Touch-Down position 1004 located at a negative side (downward in the vertical direction) of the second vertex (nadir 312) in the first axis direction by a distance b, that is less than a predetermined distance. FIG. 10D is a display example when the processing in S906 is performed via S905, and the display of the wide visual field image on the display 105 is changed by rotating the wide visual field image 301 clockwise (rightward rotation 1003 when viewed from the top) around the yaw axis 302, which is the first axis. When the wide visual field image is displayed on the display 105, the image rotates clockwise in the entire display region. The Touch-Down position 1004, which is a start point of the slide operation 1005, is below the nadir 312, but close to nadir 312. This means that the user may have touched a position below the nadir 312 when the user's actual intention was to perform the slide operation near the nadir 312. In this case, it is preferable that the display control in the case where the Touch-Down position is above the nadir 312 is performed, in other words, the display of the wide visual field image on the display 105 is changed by rotating the wide visual field image clockwise, since the movement of the image by this operation is more likely to match the actual intention of the user. In the case of FIG. 10D, when the wide visual field image is displayed on the display 105, the image rotates clockwise in the entire display region, hence the movement of the image matches with the actual intension of the user, and the sense of irritation that the user experiences can be prevented.

Figure 10E:
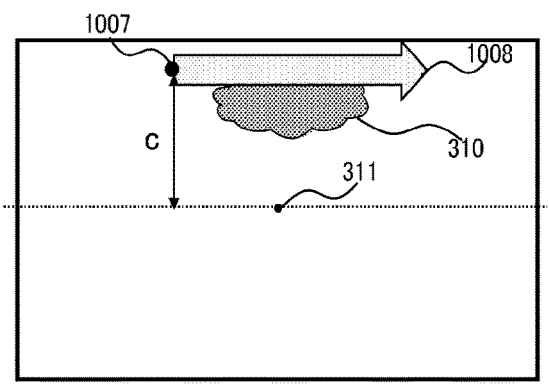
Figure 10F:
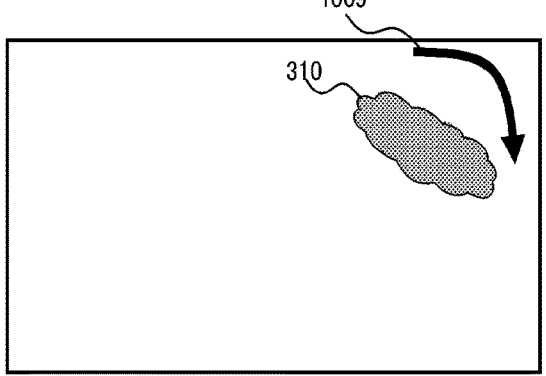

FIG. 10E indicates a state where a range of the wide visual field image 301 including the first vertex (zenith 311), which is the vertex in the positive direction of the first axis, is displayed in the image display region of the wide visual field on the display 105. In this state, the moving operation in the positive direction of the second axis (slide operation to the right 1008) is performed, starting from the Touch-Down position 1007 located at a positive side position (upward in the vertical direction) of the first vertex (zenith 311) in the first axis direction by a distance c that is at least a predetermined distance. FIG. 10F is a display example when processing in S919 is performed via S918, and the display of the wide visual field image on the display 105 is changed by rotating the wide visual field image 301 counterclockwise (leftward rotation 1009 when viewed from the top) around the yaw axis 302, which is the first axis. FIG. 10F is a view when the zenith 311 is viewed from the bottom (center of the virtual sphere), hence when the wide visual field image is displayed on the display 105, the image rotates clockwise in the entire display region. Particularly in a position where the slide operation 1008 is performed, the image moves to the right, which is the same as the direction of the slide operation 1008. As mentioned above, conventionally the wide visual field image rotates clockwise when viewed from the top, hence the image rotates counterclockwise in the entire display region when the zenith 311 is viewed from the bottom. As a result, the image moves to the left at the position of the slide operation to the tight 1008, which may cause a sense of irritation to the user, but in Example 2, the sense of irritation that the user experiences can be prevented.

Figure 10G:
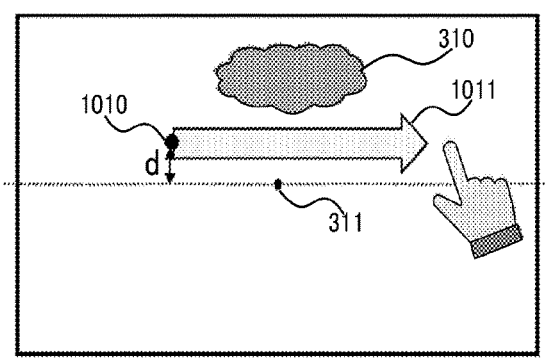
Figure 10H:
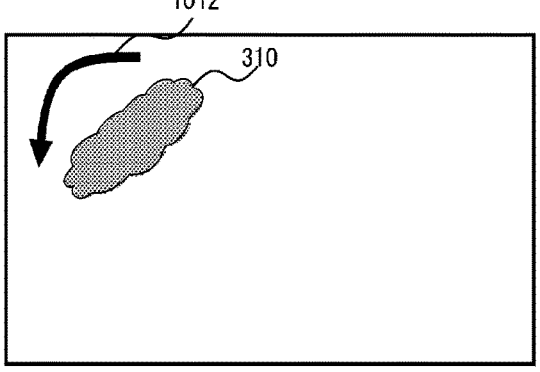

FIG. 10G indicates a state where a range of the wide visual field image 301 including the first vertex (zenith 311) which is the vertex in the positive direction of the first axis, is displayed on the image display region of the wide visual field image on the display 105. In this state, the moving operation in the positive direction of the second axis (slide operation to the right 1011), is performed, starting from the Touch-Down position 1010 located at the positive side position (upward in the vertical direction) of the first vertex (zenith 311) in the first axis direction by a distance d that is less than a predetermined distance. FIG. 10H is a display example when the processing in S906 is performed via S905, and the display of the wide visual field image on the display 105 is changed by rotating the wide visual field image 301 clockwise (rightward rotation 1012 when viewed from the top) around the yaw axis 302, which is the first axis. FIG. 10H is a view when the zenith 311 is viewed from the bottom (center of the virtual sphere), hence when the wide visual field image is displayed on the display 105, the image rotates counterclockwise in the entire display region. The Touch-Down position 1010, which is the start position of the slide operation 1011, is above the zenith 311 but is close to the zenith 311. This means that the user may have touch a position above the zenith 311 when the user's actual intention was to perform the slide operation near the zenith 311. In this case, it is preferable that the display control in the case where the Touch-Down position is below the zenith 311 is performed, in other words, the display of the wide visual field image on the display 105 is changed by rotating the wide visual field image clockwise. (The wide visual field image is rotated counterclockwise when the zenith is viewed from the bottom. The movement of the image by this operation is more likely to match the actual intention of the user. In the case of FIG. 10H, when the wide visual field image is displayed on the display 105, the image rotates counterclockwise in the entire display region, hence the movement of the image matches with the actual intention of the user, and the sense of irritation the user experiences can be prevented.

According to the display control for the wide visual field image performed by the electronic device 100 of Example 2, the processing to match the direction of the slide operation and the rotating direction of the wide visual field image is performed only when the slide operation is performed, starting from a position that is distant from the zenith 311 or the nadir 312 by at least a predetermined distance. Therefore, the processing unique to the present invention is performed only the slide operation is intentionally performed, starting from a point above the zenith 311 or below the nadir 312 (near the upper end or lower end of the wide visual field image). In other words, the direction of the slide operation and the rotating direction of the wide visual field image are the opposite, so that the display of the wide visual field image on the display 105 changes in the same direction as the direction of the slide operation. As a result, rotation of the image unintended by the user can be prevented, and the sense of irritation that the user experiences can be prevented with more certainty.

In Examples 1 and 2, four directions of the slide operation (rightward, leftward, upward and downward) were described as the slide operation, but the display range is also changed in accordance with the slide operation in a diagonal direction. In this case, the processing described above for the slide operation to the right, slide operation to the left, upward slide operation and downward slide operation are performed for each moving component of the slide operation, that is, the right component, left component, upward component and downward component respectively. For example, in the case where the display range includes the nadir 312 and the slide operation is performed diagonally to the lower right, starting from a point above the nadir 312, the display range moves to the left by a moving amount that is the same as the amount of rotation of the wide visual field image rightward around the yaw axis (for the amount of the moving components of the slide operation to the right). In this case, the display image on the display moves to the right in accordance with the right components of the slide operation. At the same time, the display range moves upward by a moving amount that is the same as the amount of rotation of the wide visual field image rightward around the pitch axis (for the amount of the moving components of the downward slide operation), and the display image on the display moves downward in accordance with the downward components of the slide operation. Further, in the case where the display range includes the nadir 312 and the slide operation is performed diagonally to the lower right, starting from a point below the nadir 321 by at least a predetermined distance, the display range moves to the right by the moving amount that is the same as the amount of rotation of the wide visual field image leftward around the yaw axis (for the amount of the moving components of the slide operation to the right). In this case, the display image on the display rotates leftward in the entire display region, but in the position of the slide operation, the display image moves to the right in accordance with the right components of the slide operation. At the same time, the display range moves upward by the moving amount that is the same as the amount of rotation of the wide visual field image rightward around the pitch axis (for the amount of moving components of the downward slide operation), and the display image on the display moves downward in accordance with the downward components of the slide operation.

In Examples 1 and 2, when the slide operation is performed for a displayed region of the wide visual field image, the rotating direction of the wide visual field image in accordance with the slide operation is reversed, depending on the positional relationship between the start point of the slide operation and the rotation axis (zenith or nadir). This is a processing to reduce the sense of irritation the user experiences due to the difference between the slide operation and the moving direction of the image. However, if the slide operation is for a region that is different from the image display region of the wide visual field image that is moved by the slide operation, a sense of irritation is not generated. Therefore, in this case, the rotating direction is the same as the slide direction, regardless of the positional relationship between the start point of the slide operation and the rotation axis (zenith or nadir). The "image display region" here refers to a region which is extracted from the wide visual field image and displayed in an enlarged state, and is a display region where scrolling occurs such that the display range is changed by the slide operation. For example, a scroll bar provided around the image display region is a region that is different from the image display region. Therefore, in the case of the slide operation performed on the scroll bar, the rotating direction (scroll direction) is the same as the slide direction, regardless of the positional relationship between the start point of the slide operation and the rotation axis (zenith or nadir). Further, in the case of the slide operation on the display region to specify the position of the display range, which is disposed on a different position from the image display region, the following processing is performed. That is, the rotating direction (scroll direction) is the same as the slide direction, regardless of the positional relationship between the start point of the slide operation and the rotation axis (zenith or nadir). The display region to specify the position of the display range is, for example, a grid display region to specify coordinates, a display region simulating a sphere, and a region displaying the entire wide visual field image to specify a position. An instruction frame to specify a position is displayed in the display region to specify a position of the display range, and the instruction frame can be moved by the slide operation, but a background of the instruction frame is not moved in accordance with the slide operation. If the instruction frame is moved, the range of the wide visual field image that is displayed in the image display region is changed in accordance with the position of the instruction frame.

In Examples 1 and 2, the moving operation in the image display region is the slide operation by touching (Touch-Move) but the moving operation is not limited to this. The present invention can be applied in the same manner to other operations, as long as the moving operation can be performed by specifying a position in the image display region. For example, if the display range of the wide visual field image can be changed by a drag operation in the image display region using a mouse, the present invention can be applied to the drag operation in the same manner as the slide operation mentioned above. The present invention is also applicable to an operation of pointing to a position in the image display region, and moving the pointed position using other pointing devices.

The unique effect of the present invention is that the relationship between the direction of the slide operation (Touch-Move) input by the user and the moving direction of the image displayed on the display becomes constant, regardless of the positional relationship between the Touch-Down position of the slide operation and the zenith or the nadir. In Examples 1 and 2, it is controlled such that the operating direction of the slide and the moving direction of the image are the same, regardless of the positional relationship between the Touch-Down position and the zenith or the nadir. This, however, is merely an example, that the relationship between the operating direction of the slide and the moving direction is constant, regardless of the positional relationship between the Touch-Down position and the zenith or the nadir, and the present invention is not limited to this. For example, a case of controlling the operating direction of the slide and moving direction of the image to be the opposite, regardless of the positional relationship between the Touch-Down position and the zenith or the nadir, is also included in the present invention. In this case as well, regardless of which position of the wide visual field image is selected as a start point of the operation to move the display range, the image displayed on the display always moves in an opposite direction of the moving direction of the operation to move the display range, hence the sense of irritation that the user experiences can be prevented.

In the above description, it was assumed that the various controls are performed by the CPU 101, but may be performed by a single hardware, or by a plurality of hardware (e.g. a plurality of processors and circuits share: the processing to control the entire apparatus.

Although the present invention has been described based on the preferred embodiments thereof, the present invention is not limited to these specific embodiments, but include various aspects within the scope that does not depart from the summary of the invention. Furthermore, each embodiment of the present invention described above is merely an example, and each embodiment may be appropriately combined.

In the above embodiments, a case of applying the present invention to such an electronic device as a smartphone was described as an example. However, the present invention is not limited to this example, but may be applied to an apparatus that includes an input unit which receives input of an operation instruction for a wide visual field image, and a control unit which controls a range of the wide visual field image to be displayed on the display unit responding to the input of the operation instruction. In other words, the present invention is applicable to a personal computer, a PDA, a portable telephone terminal, a portable image viewer and a printer or smart watch that includes a display. The present invention is also applicable to a VR viewer, a digital photo frame, a music player, a game machine, an electronic book reader, and an imaging device having a viewer function.

Other Embodiments

Embodiment(s) of the present invention can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060528, filed on Mar. 27, 2018, which is hereby incorporated by reference herein in its entirety.

What is claimed is:

1. A display control apparatus, comprising:
a memory and at least one processor and/or at least one circuit to perform operations of units including:
an input unit configured to receive an input for specifying a position in a wide visual field image displayed on a display unit; and
a display control unit configured to perform control to determine a part of the wide visual field image based on the specified position and display the determined part of the wide visual field image on the display unit,
wherein the display control unit performs control to move the displayed part of the wide visual field image along with a moving operation that is a slide operation or a drag operation if the input unit receives the input through the moving operation and thereby the specified position moves according to the moving operation,
wherein the wide visual image is mapped on a surface of a virtual sphere,
wherein the display control unit is configured to determine whether the displayed part of the wide visual field image includes a center position, which is at an intersection of the surface of the virtual sphere and a first axis of the virtual sphere, and to control the displayed part of the wide visual field image to move along with the moving operation based on a determination result, such that:
the surface of the virtual sphere rotates clockwise around the first axis of the virtual sphere if the displayed part of the wide visual field image does not include the center position and the moving operation is in a first direction, and the surface of the virtual sphere rotates counterclockwise around the first axis of the virtual sphere if the displayed part of the wide visual field image does not include the center position and the moving operation is in a second direction opposite to the first direction;

wherein the display control unit is further configured to determine a positional relationship between a start position of the moving operation and the center position and, if the display control unit determines that the displayed part of the wide visual field image includes the center position, to perform control of the displayed part of the wide visual field image to move along with the moving operation based on the positional relationship and the moving operation, such that:

the displayed part of the wide visual field image moves along with the moving operation such that the surface of the virtual sphere rotates in a first rotation direction opposite to a second rotation direction, in which the surface of the virtual sphere rotates if the displayed part of the wide visual field image does not include the center position around the first axis of the virtual sphere, depending on the positional relationship between the start point of the moving operation and the center position if the displayed part of the wide visual field image includes the center position, wherein the first direction and the second direction cross the first axis of the virtual sphere;

wherein one of: (a) the first axis is a vertical axis, the moving operation in the first direction is a rightward slide operation and the moving operation in the second direction is a leftward slide operation; and (b) the first axis is a horizontal axis, the moving operation in the first direction is an upward slide operation and the moving operation in the second direction is a downward slide operation; and wherein the first direction and the second direction cross the first axis of the virtual sphere, when viewed from a depth direction.

2. The display control apparatus according to claim 1, wherein the displayed part of the wide visual field image moves along with the moving operation such that the surface of the virtual sphere rotates counterclockwise around the first axis of the virtual sphere depending on the positional relationship between the start point of the moving operation and the center position if the displayed part of the wide visual field image includes the center position and the moving operation is in the first direction.

3. The display control apparatus according to claim 2, wherein the displayed part of the wide visual field image moves along with the moving operation such that the surface of the virtual sphere rotates counterclockwise around the first axis of the virtual sphere in a case where the center position is a nadir of the virtual sphere and the start point of the moving operation is below the center position in the displayed part of the wide visual field image if the displayed part of the wide visual field image includes the center position and the moving operation is in the first direction.

4. The display control apparatus according to claim 1, wherein the first direction is a rightward direction from the start point of the moving operation, the second direction is a leftward direction from the start point of the moving operation.

5. The display control apparatus according to claim 1, wherein the displayed part of the wide visual field image moves along with the moving operation in a third direction perpendicular to the first direction and the second direction such that the surface of the virtual sphere rotates in a third rotation direction corresponding to the third direction around another axis of the virtual sphere vertical to the first axis of the virtual sphere if the input unit receives a moving operation in the third direction.

6. The display control apparatus according to claim 5, wherein the displayed part of the wide visual field image moves along with the moving operation such that the surface of the virtual sphere rotates in the third rotation direction around another axis of the virtual sphere vertical to the first axis of the virtual sphere regardless of whether the displayed part of the wide visual field image includes the center position if the input unit receives the moving operation in the third direction.

7. The display control apparatus according to claim 1, wherein the displayed part of the wide visual field image moves along with the moving operation such that the surface of the virtual sphere rotates clockwise around the first axis of the virtual sphere regardless of the positional relationship between the start point of the moving operation and the center position if the displayed part of the wide visual field image does not include the center position and the moving operation is in the first direction.

8. The display control apparatus according to claim 1, further includes a touch detection unit configured to detect a touch operation to the display unit, wherein the input unit receives a result of the detection as the input.

9. The display control apparatus according to claim 1, wherein the input unit is a pointing device.

10. The display control apparatus according to claim 1, wherein the wide visual field image is at least one of a VR image, an omni-directional image, an omni-azimuth image and an image having a viewing angle of at least 1800.

11. A method of controlling a display control apparatus, comprising:

receiving an input for specifying a position in a wide visual field image displayed on a display unit; and performing control to determine a part of the wide visual field image based on the specified position and display the determined part of the wide visual field image on the display unit, wherein the control is performed to move the displayed part of the wide visual field image along with a moving operation that is a slide operation or a drag operation if the input is received through the moving operation and thereby the specified position moves according to the moving operation, wherein the wide visual image is mapped on a surface of a virtual sphere, determining whether the displayed part of the wide visual field image includes a center position, which is at an intersection of the surface of the virtual sphere and a first axis of the virtual sphere, and controlling the displayed part of the wide visual field image to move along with the moving operation based on a determination result, such that:

the surface of the virtual sphere rotates clockwise around the first axis of the virtual sphere if the displayed part of the wide visual field image does not include the center position and the moving operation is in a first direction, the surface of the virtual sphere rotates counterclockwise around the first axis of the virtual sphere if the displayed part of the wide visual field image does not include the center position and the moving operation is in a second direction opposite to the first direction; and determining a positional relationship between a start position of the moving operation and the center position, if it is determined that the displayed part of the wide visual field image includes the center position, and performing control of the displayed part of the wide visual field image to move along with the moving operation based on the positional relationship and the moving operation, such that: the displayed part of the wide visual field image moves along with the moving operation such that the surface of the virtual sphere rotates in a first rotation direction opposite to a second rotation direction, in which the surface of the virtual sphere rotates if the displayed part of the wide visual field image does not include the center position around the first axis of the virtual sphere, depending on the positional relationship between the start point of the moving operation and the center position if the displayed part of the wide visual field image includes the center position, wherein the first direction and the second direction cross the first axis of the virtual sphere;

wherein one of: (a) the first axis is a vertical axis, the moving operation in the first direction is a rightward slide operation and the moving operation in the second direction is a leftward slide operation; and (b) the first axis is a horizontal axis, the moving operation in the first direction is an upward slide operation and the moving operation in the second direction is a downward slide operation; and wherein the first direction and the second direction cross the first axis of the virtual sphere, when viewed from a depth direction.

12. A non-transitory computer readable storage medium having a program stored therein, the program allowing a computer to function as each unit of the display control apparatus according to claim 1.

13. The display control apparatus according to claim 1, wherein the displayed part of the wide visual field image moves along with the moving operation such that the surface of the virtual sphere rotates clockwise around the first axis of the virtual sphere depending on the positional relationship between the start point of the moving operation and the center position if the displayed part of the wide visual field image includes the center position and the moving operation is in the second direction.

14. The display control apparatus according to claim 13, wherein the displayed part of the wide visual field image moves along with the moving operation such that the surface of the virtual sphere rotates clockwise around the first axis of the virtual sphere in a case where the center position is a zenith of the virtual sphere and the start point of the moving operation is above the center position in the displayed part of the wide visual field image if the displayed part of the wide visual field image includes the center position and the moving operation is in the second direction.

15. The display control apparatus according to claim 1, wherein the positional relationship between the start point of the moving operation and the center position includes a distance between the start point of the moving operation and the center position.

16. The display control apparatus according to claim 1, wherein the displayed part of the wide visual field image moves along with the moving operation such that the surface of the virtual sphere rotates counterclockwise around the first axis of the virtual sphere regardless of the positional relationship between the start point of the moving operation and the center position if the displayed part of the wide visual field image does not include the center position and the moving operation is in the second direction.

17. The display control apparatus according to claim 1, wherein the first direction and the second direction cross vertical to the first axis of the virtual sphere.

18. The display control apparatus according to claim 1, wherein in a case that the displayed part of the wide visual field image includes the center position, the center position being one of a Nadir and a Zenith, if the start point of the moving operation is below the Nadir or if the start point of the moving operation is above the Zenith, the surface of the virtual sphere is controlled to:

rotate counterclockwise around the first axis of the virtual sphere if the moving operation is in the first direction; and rotate clockwise around the first axis of the virtual sphere if the moving operation is in the second direction;

if the start point of the moving operation is above the Nadir and below the Zenith, the surface of the virtual sphere is controlled to:

rotate clockwise around the first axis of the virtual sphere if the moving operation is in the first direction; and rotate counterclockwise around the first axis of the virtual sphere if the moving operation is in the second direction.

* * * * *